US008950317B2

(12) United States Patent
Tanner et al.

(10) Patent No.: US 8,950,317 B2
(45) Date of Patent: Feb. 10, 2015

(54) BEVERAGE PREPARATION MACHINES

(75) Inventors: Roger Geoffrey Tanner, Banbury (GB);
Paul James Wilson, Upper Arncott
(GB); Paul Adrian Saxton, Towcester
(GB)

(73) Assignee: Kraft Foods R & D, Inc., Deerfield, IL
(US)

( * ) Notice: Subject to any disclaimer, the term of this
patent is extended or adjusted under 35
U.S.C. 154(b) by 714 days.

(21) Appl. No.: 12/600,478

(22) PCT Filed: May 16, 2008

(86) PCT No.: PCT/US2008/063831
§ 371 (c)(1),
(2), (4) Date: Jan. 19, 2010

(87) PCT Pub. No.: WO2008/144469
PCT Pub. Date: Nov. 27, 2008

(65) Prior Publication Data
US 2010/0147157 A1    Jun. 17, 2010

Related U.S. Application Data

(60) Provisional application No. 60/940,118, filed on May 25, 2007.

(30) Foreign Application Priority Data

May 18, 2007 (GB) .................................. 0709586.2

(51) Int. Cl.
A47J 31/00    (2006.01)
A47J 31/46    (2006.01)
A47J 31/36    (2006.01)

(52) U.S. Cl.
CPC .............. *A47J 31/46* (2013.01); *A47J 31/3676* (2013.01); *A47J 31/3695* (2013.01); *A47J 31/369* (2013.01)
USPC .......................................... 99/289 R; 99/295

(58) Field of Classification Search
CPC .............. A47J 31/3614; A47J 31/3619; A47J 31/3695; A47J 31/3676; A47J 31/368; A47J 31/3685; A47J 31/369
USPC .................................................. 99/295, 289 R
See application file for complete search history.

(56) References Cited

U.S. PATENT DOCUMENTS 2,243,895 A    6/1941  Brown
2,715,868 A    8/1955  Brown
(Continued)

FOREIGN PATENT DOCUMENTS

CA    2549689 A1    7/2005
EP    0 151 252 A1  8/1985
(Continued)

OTHER PUBLICATIONS

European Patent Office Communication of a Notice of Opposition dated Mar. 22, 2007, Opposition to European Patent EP 1 440 910 B1 by Opponent Mars Incorporated, 17 pages.
(Continued)

*Primary Examiner* — Reginald L Alexander
(74) *Attorney, Agent, or Firm* — Fitch, Even, Tabin & Flannery LLP

(57) ABSTRACT

A delivery head for a beverage preparation machine comprising a movable first part, a fixed second part and a cartridge guide; the first part being movable between an open position and a clamping position; the cartridge guide being operatively engaged with the first part and slidably movable relative to the second part between a loading position and a dispensing position; the cartridge guide being located in the loading position when the first part is in the open position so as to enable loading of a cartridge into the cartridge guide; wherein on movement of the first part into the clamping position the cartridge guide is slidable into the dispensing position due to the operative engagement of the cartridge guide with the first part.

41 Claims, 12 Drawing Sheets

(56) References Cited

U.S. PATENT DOCUMENTS

| | | | |
|---|---|---|---|
| 2,899,106 A | 8/1959 | Weinert | |
| 3,292,527 A | 12/1966 | Stasse | |
| 3,336,857 A | 8/1967 | Knodt et al. | |
| 3,403,617 A | 10/1968 | Lampe | |
| 3,607,297 A | 9/1971 | Fasano et al. | |
| 3,805,999 A | 4/1974 | Syverson | |
| D255,529 S | 6/1980 | Dziekonski | |
| 4,206,694 A | 6/1980 | Moskowitz et al. | |
| 4,253,385 A | 3/1981 | Illy | |
| 4,382,402 A | 5/1983 | Alvarez | |
| 4,389,191 A | 6/1983 | Lowe | |
| 4,452,130 A | 6/1984 | Klein | |
| 4,484,515 A | 11/1984 | Illy | |
| 4,551,611 A | 11/1985 | Longo | |
| 4,653,390 A | 3/1987 | Hayes | |
| 4,724,752 A | 2/1988 | Aliesch et al. | |
| 4,738,378 A | 4/1988 | Oakley et al. | |
| 4,744,291 A | 5/1988 | Wallin | |
| 4,775,048 A | 10/1988 | Baecchi et al. | |
| 4,787,299 A | 11/1988 | Levi et al. | |
| 4,838,152 A | 6/1989 | Kubicko et al. | |
| 4,846,052 A | 7/1989 | Favre et al. | |
| 4,873,915 A | 10/1989 | Newman et al. | |
| 4,875,408 A | 10/1989 | McGee | |
| 4,876,953 A | 10/1989 | Imamura et al. | |
| 4,917,005 A | 4/1990 | Knepler | |
| 4,920,252 A | 4/1990 | Yoshino | |
| 4,920,870 A | 5/1990 | Newman et al. | |
| 4,921,712 A | 5/1990 | Malmquist | |
| 4,990,352 A | 2/1991 | Newman et al. | |
| D316,795 S | 5/1991 | Brewer | |
| 5,014,611 A | 5/1991 | Illy et al. | |
| 5,063,836 A | 11/1991 | Patel | |
| 5,072,660 A | 12/1991 | Helbling | |
| 5,080,008 A | 1/1992 | Helbling | |
| 5,111,740 A | 5/1992 | Klein | |
| 5,134,924 A | 8/1992 | Vicker | |
| 5,178,058 A | 1/1993 | van Dort et al. | |
| 5,183,998 A | 2/1993 | Hoffman et al. | |
| 5,186,096 A | 2/1993 | Willi | |
| 5,197,374 A | 3/1993 | Fond | |
| 5,242,702 A | 9/1993 | Fond | |
| 5,259,295 A | 11/1993 | Timm | |
| 5,265,520 A | 11/1993 | Giuliano | |
| 5,272,960 A | 12/1993 | Kinna | |
| 5,285,717 A | 2/1994 | Knepler | |
| 5,287,797 A | 2/1994 | Grykiewicz et al. | |
| 5,303,639 A | 4/1994 | Bunn et al. | |
| 5,325,765 A | 7/1994 | Sylvan | |
| 5,327,815 A | 7/1994 | Fond et al. | |
| 5,343,799 A | 9/1994 | Fond | |
| 5,347,916 A | 9/1994 | Fond et al. | |
| 5,349,897 A | 9/1994 | King et al. | |
| 5,375,508 A | 12/1994 | Knepler et al. | |
| 5,398,595 A | 3/1995 | Fond et al. | |
| 5,398,596 A | 3/1995 | Fond | |
| 5,408,917 A | 4/1995 | Lüssi | |
| 5,440,972 A | 8/1995 | English | |
| 5,455,887 A | 10/1995 | Dam | |
| 5,463,932 A | 11/1995 | Olson | |
| 5,472,719 A | 12/1995 | Favre | |
| 5,479,849 A | 1/1996 | King et al. | |
| 5,531,152 A | 7/1996 | Gardosi | |
| 5,549,035 A | 8/1996 | Wing-Chung | |
| 5,603,254 A | 2/1997 | Fond et al. | |
| 5,638,740 A | 6/1997 | Cai | |
| 5,638,741 A | 6/1997 | Cisaria | |
| 5,639,023 A | 6/1997 | Hild et al. | |
| 5,649,472 A | 7/1997 | Fond et al. | |
| D389,694 S | 1/1998 | Vinson | |
| 5,704,275 A | 1/1998 | Warne | |
| 5,738,001 A | 4/1998 | Liverani | |
| 5,755,149 A | 5/1998 | Blanc et al. | |
| 5,762,987 A | 6/1998 | Fond et al. | |
| 5,776,527 A | 7/1998 | Blanc | |
| 5,794,519 A * | 8/1998 | Fischer | 99/295 |
| 5,826,492 A | 10/1998 | Fond et al. | |
| 5,840,189 A | 11/1998 | Sylvan et al. | |
| 5,858,437 A | 1/1999 | Anson | |
| 5,860,354 A | 1/1999 | Jouatel et al. | |
| 5,862,738 A | 1/1999 | Warne | |
| D408,679 S | 4/1999 | Potts | |
| 5,897,899 A | 4/1999 | Fond | |
| 5,899,137 A | 5/1999 | Miller et al. | |
| 5,921,168 A | 7/1999 | Nello | |
| 5,943,944 A | 8/1999 | Lassota | |
| 5,967,021 A | 10/1999 | Yung | |
| 5,974,950 A | 11/1999 | King | |
| 5,992,298 A | 11/1999 | Illy et al. | |
| 6,000,317 A | 12/1999 | Van Der Meer | |
| 6,006,653 A | 12/1999 | Sham et al. | |
| 6,009,792 A | 1/2000 | Kraan | |
| D419,821 S | 2/2000 | Powell et al. | |
| 6,021,705 A | 2/2000 | Dijs | |
| D423,863 S | 5/2000 | Lupi | |
| 6,062,127 A | 5/2000 | Klosinski et al. | |
| 6,079,315 A | 6/2000 | Beaulieu | |
| 6,082,245 A | 7/2000 | Nicolai | |
| 6,082,247 A | 7/2000 | Beaulicu | |
| 6,095,031 A | 8/2000 | Warne | |
| 6,109,168 A | 8/2000 | Illy et al. | |
| 6,117,471 A | 9/2000 | King | |
| 6,142,063 A | 11/2000 | Beaulieu et al. | |
| 6,158,328 A | 12/2000 | Cai | |
| 6,170,386 B1 | 1/2001 | Paul | |
| 6,173,117 B1 | 1/2001 | Clubb | |
| 6,178,874 B1 | 1/2001 | Joergensen | |
| 6,182,554 B1 | 2/2001 | Beaulieu et al. | |
| 6,186,051 B1 | 2/2001 | Aarts | |
| D443,792 S | 6/2001 | Peters et al. | |
| 6,240,832 B1 | 6/2001 | Schmed et al. | |
| 6,240,833 B1 | 6/2001 | Sham et al. | |
| 6,245,371 B1 | 6/2001 | Gutwein et al. | |
| 6,279,459 B1 | 8/2001 | Mork et al. | |
| 6,289,948 B1 | 9/2001 | Jeannin et al. | |
| D452,107 S | 12/2001 | Cahen | |
| D452,433 S | 12/2001 | Lazaris | |
| D452,434 S | 12/2001 | Sweeney | |
| D454,466 S | 3/2002 | Hong | |
| 6,405,637 B1 | 6/2002 | Cai | |
| D459,628 S | 7/2002 | Cahen | |
| D460,653 S | 7/2002 | Cahen | |
| D461,358 S | 8/2002 | Cahen | |
| 6,440,256 B1 | 8/2002 | Gordon | |
| D462,865 S | 9/2002 | Honan | |
| 6,499,388 B2 | 12/2002 | Schmed | |
| 6,536,332 B2 | 3/2003 | Schmed | |
| D474,110 S | 5/2003 | Sweeney | |
| D474,111 S | 5/2003 | Lazaris | |
| D475,567 S | 6/2003 | Hsu | |
| 6,589,577 B2 | 7/2003 | Lazaris | |
| 6,606,938 B2 | 8/2003 | Taylor | |
| 6,607,762 B2 | 8/2003 | Lazaris | |
| D479,939 S | 9/2003 | Au | |
| 6,612,224 B2 | 9/2003 | Mercier et al. | |
| 6,644,173 B2 | 11/2003 | Lazaris et al. | |
| 6,645,537 B2 | 11/2003 | Sweeney | |
| 6,655,260 B2 | 12/2003 | Lazaris | |
| 6,658,989 B2 | 12/2003 | Sweeney | |
| 6,666,130 B2 | 12/2003 | Taylor | |
| 6,672,200 B2 | 1/2004 | Duffy | |
| 6,698,228 B2 | 3/2004 | Kateman et al. | |
| 6,698,332 B2 | 3/2004 | Kollep et al. | |
| 6,698,333 B2 | 3/2004 | Halliday et al. | |
| 6,708,600 B2 | 3/2004 | Winkler | |
| D489,215 S | 5/2004 | Honan | |
| D489,930 S | 5/2004 | Tse | |
| 6,759,072 B1 | 7/2004 | Gutwein et al. | |
| 6,786,136 B2 | 9/2004 | Cirigliano et al. | |
| D497,278 S | 10/2004 | Picozza et al. | |
| 6,799,503 B2 | 10/2004 | Kollep et al. | |
| 6,857,353 B2 | 2/2005 | Kollep et al. | |
| D502,362 S | 3/2005 | Lazaris | |
| D502,841 S | 3/2005 | Santer | |

(56) References Cited

U.S. PATENT DOCUMENTS

| | | | |
|---|---|---|---|
| 6,935,222 B2 | 8/2005 | Chen et al. | |
| 6,941,855 B2 | 9/2005 | Denisart et al. | |
| 6,955,116 B2 | 10/2005 | Hale | |
| D513,572 S | 1/2006 | Schaffeld | |
| 7,063,238 B2 | 6/2006 | Hale | |
| 7,097,074 B2 | 8/2006 | Halliday et al. | |
| D530,560 S | 10/2006 | Lin | |
| 7,165,488 B2 | 1/2007 | Bragg et al. | |
| 7,213,506 B2 | 5/2007 | Halliday et al. | |
| 7,219,596 B2 * | 5/2007 | Kief, Jr. | 99/289 R |
| 7,219,598 B2 | 5/2007 | Halliday et al. | |
| D544,299 S | 6/2007 | Schaffeld | |
| 7,231,869 B2 * | 6/2007 | Halliday et al. | 99/289 R |
| 7,243,598 B2 | 7/2007 | Halliday et al. | |
| 7,255,039 B2 | 8/2007 | Halliday et al. | |
| 7,287,461 B2 | 10/2007 | Halliday et al. | |
| 7,308,851 B2 | 12/2007 | Halliday | |
| 7,316,178 B2 | 1/2008 | Halliday et al. | |
| 7,320,274 B2 * | 1/2008 | Castellani | 99/295 |
| 7,322,277 B2 | 1/2008 | Halliday et al. | |
| 7,325,479 B2 | 2/2008 | Laigneau et al. | |
| 7,328,651 B2 | 2/2008 | Halliday et al. | |
| 7,340,990 B2 | 3/2008 | Halliday et al. | |
| 7,347,138 B2 | 3/2008 | Bragg | |
| 7,360,418 B2 | 4/2008 | Pelovitz | |
| 7,377,162 B2 | 5/2008 | Lazaris | |
| 7,398,726 B2 | 7/2008 | Streeter | |
| 7,418,899 B2 | 9/2008 | Halliday et al. | |
| 7,444,927 B1 * | 11/2008 | Crosville et al. | 99/295 |
| D582,714 S | 12/2008 | Hensel | |
| D585,692 S | 2/2009 | Borin | |
| 7,513,192 B2 | 4/2009 | Sullivan | |
| 7,523,695 B2 | 4/2009 | Streeter | |
| 7,533,603 B2 | 5/2009 | Halliday et al. | |
| 7,533,604 B2 | 5/2009 | Halliday et al. | |
| 7,640,845 B2 | 1/2010 | Woodnorth | |
| D637,484 S | 5/2011 | Winkler | |
| 7,980,169 B2 * | 7/2011 | Fischer | 99/289 R |
| D647,398 S | 10/2011 | Winkler | |
| D647,399 S | 10/2011 | Winkler | |
| 8,151,694 B2 | 4/2012 | Jacobs | |
| 8,361,527 B2 | 1/2013 | Winkler | |
| 8,495,949 B2 | 7/2013 | Tinkler | |
| 8,516,948 B2 | 8/2013 | Zimmerman | |
| 8,573,114 B2 | 11/2013 | Huang | |
| 8,609,170 B2 | 12/2013 | Tinkler | |
| 2002/0002913 A1 | 1/2002 | Mariller et al. | |
| 2002/0023543 A1 | 2/2002 | Schmed | |
| 2002/0048621 A1 | 4/2002 | Boyd et al. | |
| 2002/0078831 A1 | 6/2002 | Cai | |
| 2002/0121197 A1 | 9/2002 | Mercier et al. | |
| 2002/0121198 A1 | 9/2002 | Kollep et al. | |
| 2002/0124736 A1 * | 9/2002 | Kollep et al. | 99/289 R |
| 2002/0129712 A1 | 9/2002 | Westbrook et al. | |
| 2002/0144603 A1 | 10/2002 | Taylor | |
| 2002/0144604 A1 | 10/2002 | Winkler et al. | |
| 2002/0148356 A1 | 10/2002 | Lazaris et al. | |
| 2003/0056655 A1 | 3/2003 | Kollep et al. | |
| 2003/0066431 A1 | 4/2003 | Fanzutti et al. | |
| 2003/0145736 A1 | 8/2003 | Green | |
| 2004/0031394 A1 | 2/2004 | Yoakim et al. | |
| 2004/0089158 A1 | 5/2004 | Mahlich | |
| 2004/0182250 A1 | 9/2004 | Halliday et al. | |
| 2004/0191370 A1 | 9/2004 | Halliday et al. | |
| 2004/0191372 A1 | 9/2004 | Halliday et al. | |
| 2004/0197444 A1 | 10/2004 | Halliday et al. | |
| 2004/0211322 A1 | 10/2004 | Halliday et al. | |
| 2004/0228955 A1 | 11/2004 | Denisart et al. | |
| 2004/0237793 A1 | 12/2004 | Zurcher et al. | |
| 2005/0287251 A1 | 12/2005 | Lazaris | |
| 2006/0107839 A1 | 5/2006 | Nenov et al. | |
| 2006/0123998 A1 | 6/2006 | Castellani | |
| 2006/0174773 A1 | 8/2006 | Taylor | |
| 2006/0226228 A1 | 10/2006 | Gagne et al. | |
| 2006/0292012 A1 | 12/2006 | Brudevold | |
| 2007/0104837 A1 | 5/2007 | Yoakim et al. | |
| 2008/0095904 A1 | 4/2008 | Sullivan | |
| 2008/0229932 A1 | 9/2008 | Magg et al. | |
| 2010/0011965 A1 * | 1/2010 | Turi | 99/289 R |
| 2010/0303964 A1 | 12/2010 | Beaulieu | |
| 2013/0101716 A1 | 4/2013 | Beaulieu | |
| 2013/0122167 A1 | 5/2013 | Winkler | |
| 2013/0209636 A1 | 8/2013 | Cominelli | |

FOREIGN PATENT DOCUMENTS

| | | |
|---|---|---|
| EP | 0 334 571 A1 | 9/1989 |
| EP | 0 334 572 A1 | 9/1989 |
| EP | 0 162 417 B1 | 3/1990 |
| EP | 0 469 162 A1 | 2/1992 |
| EP | 0 638 486 A1 | 2/1995 |
| EP | 0 604 615 B1 | 9/1998 |
| EP | 0 862 882 A1 | 9/1998 |
| EP | 0 870 457 A1 | 10/1998 |
| EP | 0 904 718 A1 | 3/1999 |
| EP | 1 090 574 A1 | 4/2001 |
| EP | 1 095 605 A1 | 5/2001 |
| EP | 1 153 561 A1 | 11/2001 |
| EP | 1 208 782 A1 | 5/2002 |
| EP | 0 862 882 B1 | 7/2002 |
| EP | 0 919 171 B1 | 1/2003 |
| EP | 1 316 283 A2 | 6/2003 |
| EP | 0 904 719 B1 | 8/2003 |
| EP | 1 669 011 A1 | 6/2006 |
| EP | 1 541 070 B1 | 11/2006 |
| EP | 1721553 A1 | 11/2006 |
| EP | 1 772 398 A1 | 11/2007 |
| FR | 1 537 031 A | 8/1968 |
| GB | 468 248 | 7/1937 |
| GB | 828 529 | 2/1960 |
| GB | 1 215 840 A | 12/1970 |
| GB | 2 374 795 A | 10/2002 |
| GB | 2 374 816 A | 10/2002 |
| GB | 2 374 856 A | 10/2002 |
| GB | 2 379 624 A | 3/2003 |
| GB | 2 409 965 B | 9/2005 |
| JP | 2-87759 U | 7/1990 |
| JP | 6-18259 U | 3/1994 |
| JP | 2000-355375 A | 12/2000 |
| RU | 688175 A | 9/1979 |
| RU | 2 086 411 C1 | 8/1997 |
| RU | 2005 126 705 A | 6/2006 |
| RU | 2 283 016 C2 | 9/2006 |
| RU | 2 286 076 C2 | 10/2006 |
| WO | 95/07648 A1 | 3/1995 |
| WO | 95/16377 A1 | 6/1995 |
| WO | 9608990 A1 | 3/1996 |
| WO | 97/17006 A1 | 5/1997 |
| WO | 98/47418 A1 | 10/1998 |
| WO | 00/42891 A1 | 7/2000 |
| WO | 01/15582 A1 | 3/2001 |
| WO | 02/19875 A1 | 3/2002 |
| WO | 02/080745 A1 | 10/2002 |
| WO | 02/085170 A2 | 10/2002 |
| WO | 02/087400 A1 | 11/2002 |
| WO | 03/005295 A1 | 1/2003 |
| WO | 02/085170 A3 | 3/2003 |
| WO | 03/026470 A2 | 4/2003 |
| WO | 03/053200 A1 | 7/2003 |
| WO | 03/059778 A3 | 7/2003 |
| WO | 03/065859 A2 | 8/2003 |
| WO | 03/065859 A3 | 12/2003 |

OTHER PUBLICATIONS

Harold McGee, "On Food and Cooking," The Science and Lore of the Kitchen, Harper Collins Publishers, London, 1991, p. 16.

Codex Standard for Evaporated Milks, Codex Stan A-3-1971, Rev. Jan. 1999, 3 pages.

European Patent Office Communication of a Notice of Opposition dated Mar. 22, 2007, Opposition to European Patent EP 1 440 910 B1 by Opponent Nestec S.A., 12 pages.

Food Composition and Nutrition Tables, Dairy Products, Medpharm Scientific Publishers, Stuttgart, 1994, 5 pages.

(56) References Cited

OTHER PUBLICATIONS

Notice of Opposition to a European Patent dated May 16, 2007, Opposition to European Patent EP 1 440 908 B1 by Opponent Friesland Brands B.V., 22 pages.
Notice of Opposition to a European Patent dated May 16, 2007, Opposition to European Patent EP 1 440 908 B1 by Opponent Nestec S.A., 9 pages.
European Patent Office Communication of a Notice of Opposition dated May 22, 2007, Opposition to European Patent EP 1 440 908 B1 by Opponent Sara Lee/De N. V., 13 pages.
"More Solutions to Sticky Problems," A Guide to Getting More From Your Brookfield Viscometer, Brookfield Engineering Laboratories, Inc., Stoughton, Massachusetts, date unknown, 28 pages.
"The Helipath Stand," A Brookfield Viscometer Accessory, Brookfield Engineering Laboratories, Inc., Stoughton, Massachusetts, date unknown, 2 pages.
European Patent Office Brief Communication dated Jul. 9, 2007, Opposition to European Patent EP 1 440 908 B1, Letter from Opponent Friesland Brands B.V. dated Jul. 3, 2007, 21 pages.
European Patent Office Communication of a Notice of Opposition dated Aug. 12, 2008, Opposition to European Patent EP 1 440 640 B1 by Opponent Nestec S.A., 17 pages.
European Patent Office Brief Communication dated Aug. 30, 2007, Opposition to European Patent EP 1 440 910 B1, Letter from Opponent Mars Incorporated dated Aug. 22, 2007, 3 pages.
Notice of Opposition to a European Patent dated Sep. 13, 2007, Opposition to European Patent EP 1 440 909 B1 by Opponent Friesland Brands B.V., 9 pages.
Notice of Opposition to a European Patent dated Sep. 13, 2007, Opposition to European Patent EP 1 440 909 B1 by Opponent Nestec S.A., 7 pages.
European Patent Office Search Report for European Application EP 04 25 0357.3 dated May 11, 2004, 3 pages.
European Patent Office Search Report for European Application EP 04 25 0360.7 dated May 7, 2004, 3 pages.
European Patent Office Search Report for European Application EP 04 25 0361.5 dated May 4, 2004, 3 pages.
European Patent Office Search Report for European Application EP 04 25 0362.3 dated Mar. 22, 2004, 3 pages.
European Patent Office Search Report for European Application EP 04 25 0363.1 dated May 17, 2004, 3 pages.
European Patent Office Partial Search Report for European Application EP 04 25 0364.9 dated May 11, 2004, 4 pages.
European Patent Office Search Report for European Application EP 04 25 0365.6 dated May 7, 2004, 4 pages.
European Patent Office Search Report for European Application EP 04 25 0366.4 dated Mar. 18, 2004, 3 pages.
European Patent Office Search Report for European Application EP 04 25 0376.3 dated Mar. 23, 2004, 3 pages.
European Patent Office Search Report for European Application EP 04 25 0377.1 dated May 7, 2004, 3 pages.
European Patent Office Search Report for European Application EP 04 25 0380.5 dated May 10, 2004, 3 pages.
European Patent Office Search Report for European Application EP 04 25 0381.3 dated May 7, 2004, 4 pages.
European Patent Office Search Report for European Application EP 04 25 0382.1 dated May 7, 2004, 3 pages.
European Patent Office Search Report for European Application EP 04 25 0383.9 dated May 28, 2004, 4 pages.
European Patent Office Search Report for European Application EP 04 25 0384.7 dated May 7, 2004, 3 pages.
European Patent Office Search Report for European Application EP 04 25 0388.8 dated Jun. 1, 2004, 3 pages.
European Patent Office Search Report for European Application EP 04 25 0389.6 dated May 17, 2004, 3 pages.
European Patent Office Search Report for European Application EP 04 25 0390.4 dated Jun. 17, 2004, 4 pages.
PCT Invitation to Pay Additional Fees and Communication Relating to the Results of the Partial International Search Report of the European Patent Office International Searching Authority for International Application PCT/GB2004/000265 dated Jun. 17, 2004, 6 pages.
PCT International Search Report and Written Opinion of the European Patent Office International Searching Authority for International Application PCT/GB2004/000268 dated May 24, 2004, 10 pages.
PCT Invitation to Pay Additional Fees and Communication Relating to the Results of the Partial International Search Report of the European Patent Office International Searching Authority for International Application PCT/GB2004/000272 dated May 11, 2004, 5 pages.
PCT International Search Report and Written Opinion of the European Patent Office International Searching Authority for International Application PCT/GB2004/000272 dated Sep. 7, 2004, 17 pages.
PCT International Search Report and Written Opinion of the European Patent Office International Searching Authority for International Application PCT/GB2004/000273 dated May 12, 2004, 9 pages.
PCT Invitation to Pay Additional Fees and Communication Relating to the Results of the Partial International Search Report of the European Patent Office International Searching Authority for International Application PCT/GB2004/000276 dated May 24, 2004, 7 pages.
PCT International Search Report and Written Opinion of the European Patent Office International Searching Authority for International Application PCT/GB2004/000276 dated Sep. 7, 2004, 19 pages.
PCT International Search Report and Written Opinion of the European Patent Office International Searching Authority for International Application PCT/GB2004/000279 dated May 17, 2004, 9 pages.
PCT International Search Report and Written Opinion of the European Patent Office International Searching Authority for International Application PCT/GB2004/000282 dated Jun. 3, 2004, 9 pages.
PCT International Search Report and Written Opinion of the European Patent Office International Searching Authority for International Application PCT/GB2004/000287 dated Jun. 16, 2004, 10 pages.
The United Kingdom Patent Office Combined Search and Examination Report for Great Britain Application GB 0301679.7 dated Jun. 16, 2003, 4 pages.
The United Kingdom Patent Office Combined Search and Examination Report for Great Britain Application GB 0301680.5 dated Jun. 19, 2003, 5 pages.
The United Kingdom Patent Office Combined Search and Examination Report for Great Britain Application GB 0301681.3 dated Jun. 24, 2003, 4 pages.
The United Kingdom Patent Office Combined Search and Examination Report for Great Britain Application GB 0301696.1 dated May 27, 2003, 4 pages.
The United Kingdom Patent Office Combined Search and Examination Report for Great Britain Application GB 0301698.7 dated Jun. 16, 2003, 4 pages.
The United Kingdom Patent Office Combined Search and Examination Report for Great Britain Application GB 0301702.7 dated May 16, 2003, 4 pages.
The United Kingdom Patent Office Combined Search and Examination Report for Great Britain Application GB 0301708.4 dated Jun. 12, 2003, 4 pages.
The United Kingdom Patent Office Combined Search and Examination Report for Great Britain Application GB 0301709.2 dated May 8, 2003, 4 pages.
The United Kingdom Patent Office Combined Search and Examination Report for Great Britain Application GB 0301710.0 dated Jun. 12, 2003, 4 pages.
The United Kingdom Patent Office Combined Search and Examination Report for Great Britain Application GB 0301713.4 dated Jul. 16, 2003, 5 pages.

(56) References Cited

OTHER PUBLICATIONS

The United Kingdom Patent Office Combined Search and Examination Report for Great Britain Application GB 0301733.2 dated Jun. 27, 2003, 4 pages.
The United Kingdom Patent Office Combined Search and Examination Report for Great Britain Application GB 0301734.0 dated Jun. 27, 2003, 4 pages.
The United Kingdom Patent Office Combined Search and Examination Report for Great Britain Application GB 0301735.7 dated Jul. 4, 2003, 4 pages.
The United Kingdom Patent Office Combined Search and Examination Report for Great Britain Application GB 0301738.1 dated Jun. 9, 2003, 4 pages.
The United Kingdom Patent Office Combined Search and Examination Report for Great Britain Application GB 0301739.9 dated Jun. 17, 2003, 6 pages.
The United Kingdom Patent Office Combined Search and Examination Report for Great Britain Application GB 0301741.5 dated Jun. 16, 2003, 4 pages.
The United Kingdom Patent Office Combined Search and Examination Report for Great Britain Application GB 0301745.6 dated Jun. 17, 2003, 4 pages.
The United Kingdom Patent Office Combined Search and Examination Report for Great Britain Application GB 0301747.2 dated May 30, 2003, 5 pages.
Results of Literature search performed before May 18, 2007, 1 page.

* cited by examiner

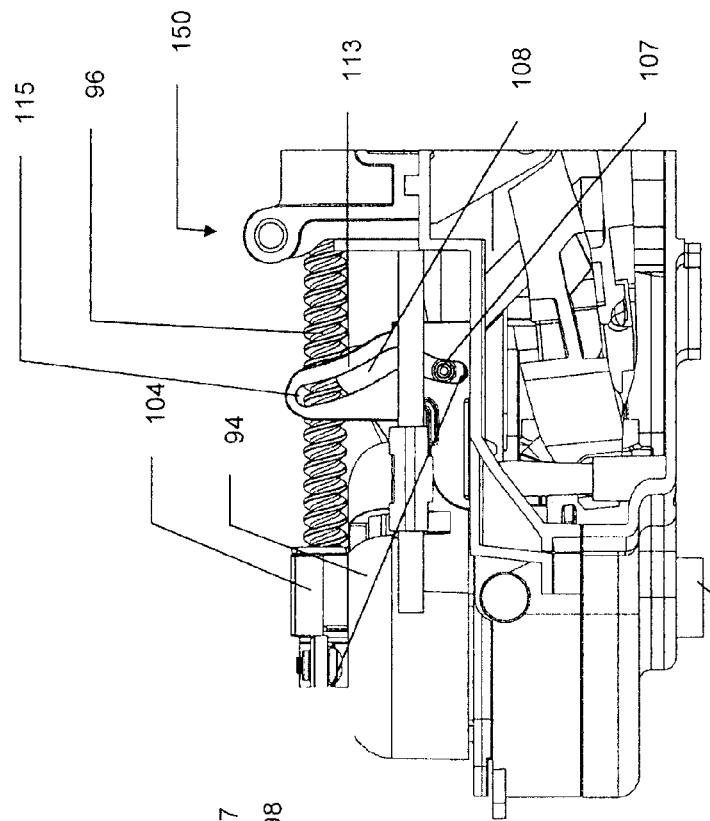
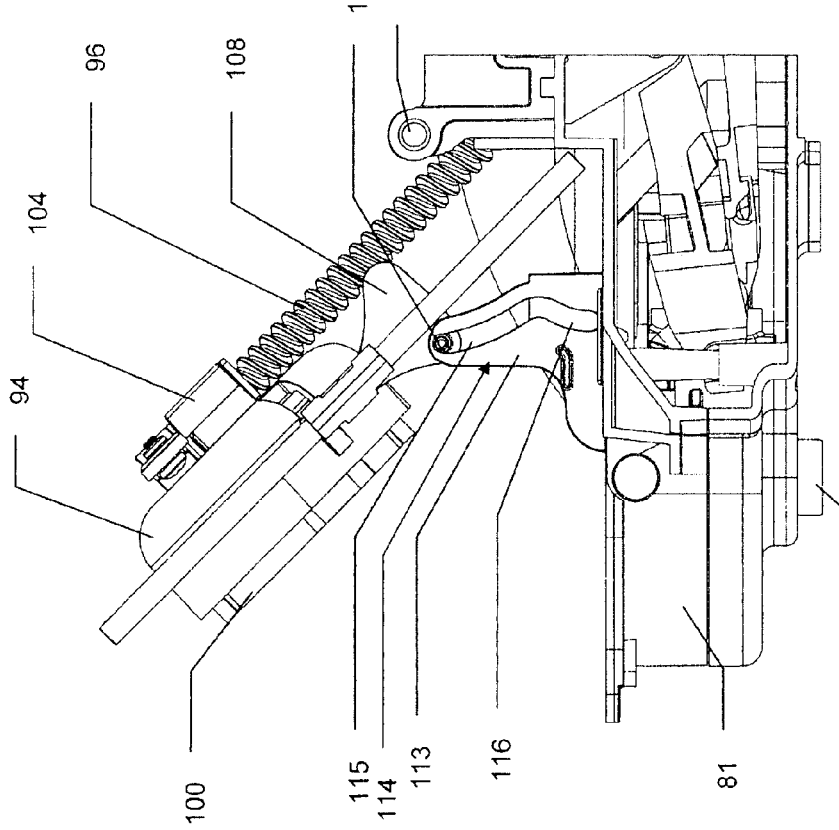
Fig. 8b
Fig. 8a

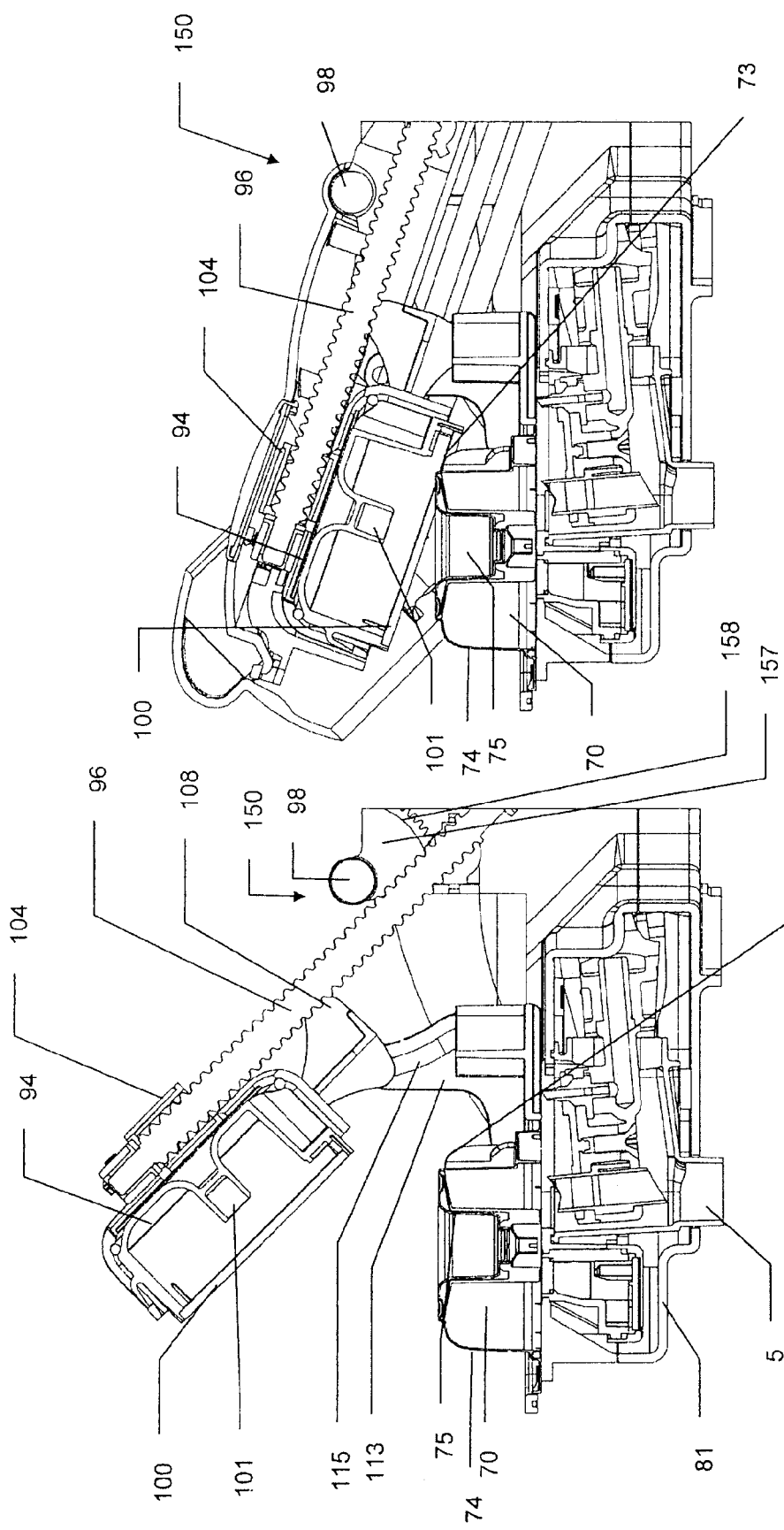

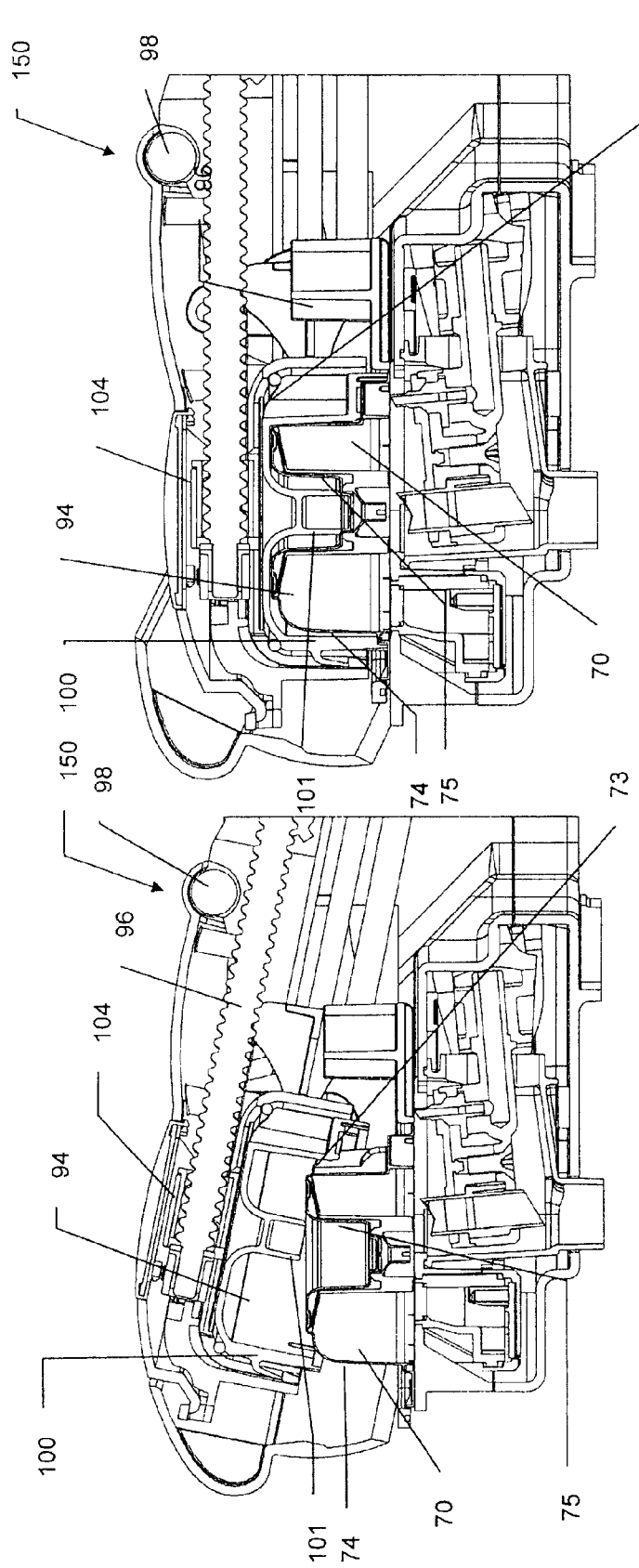

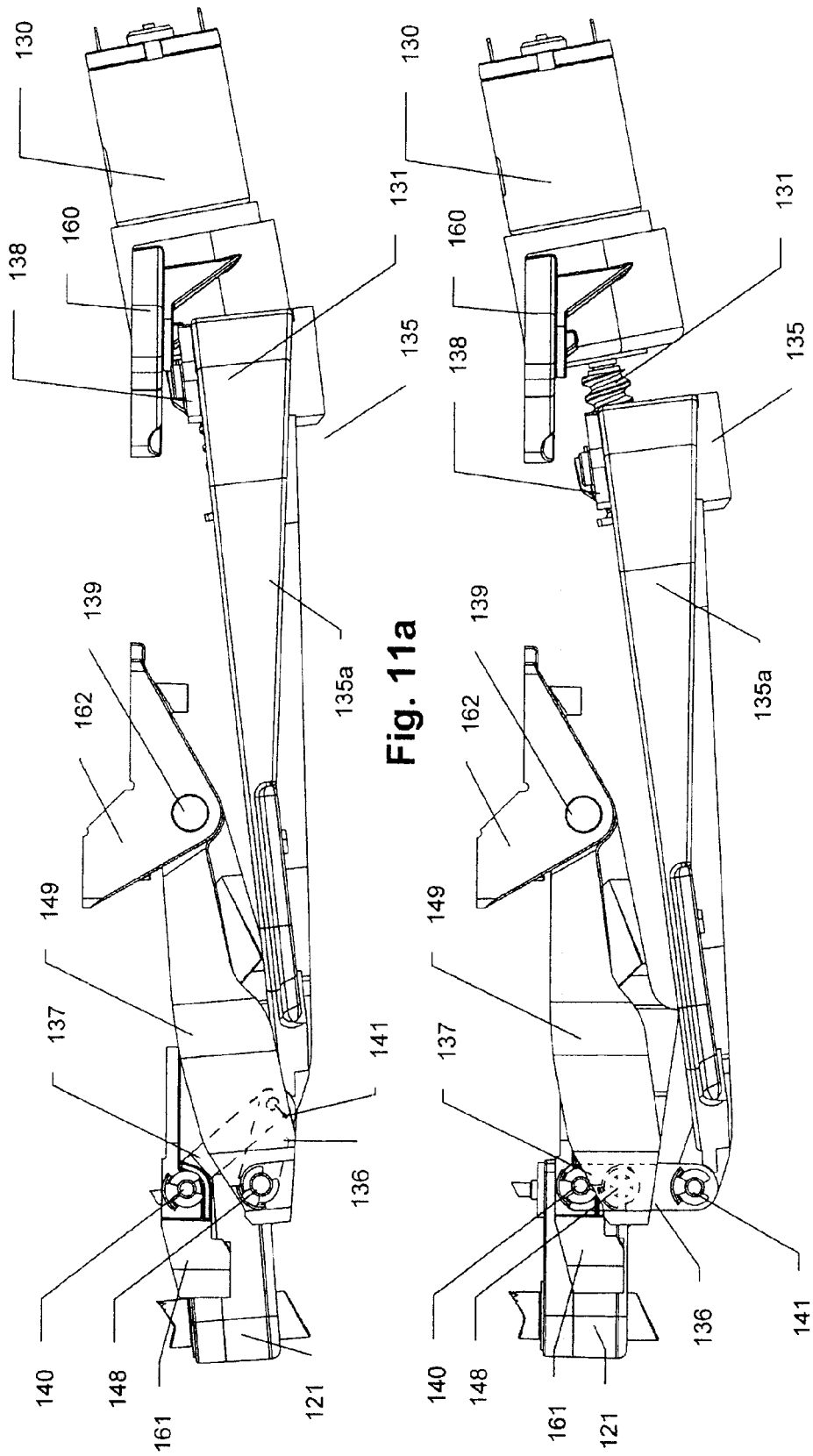

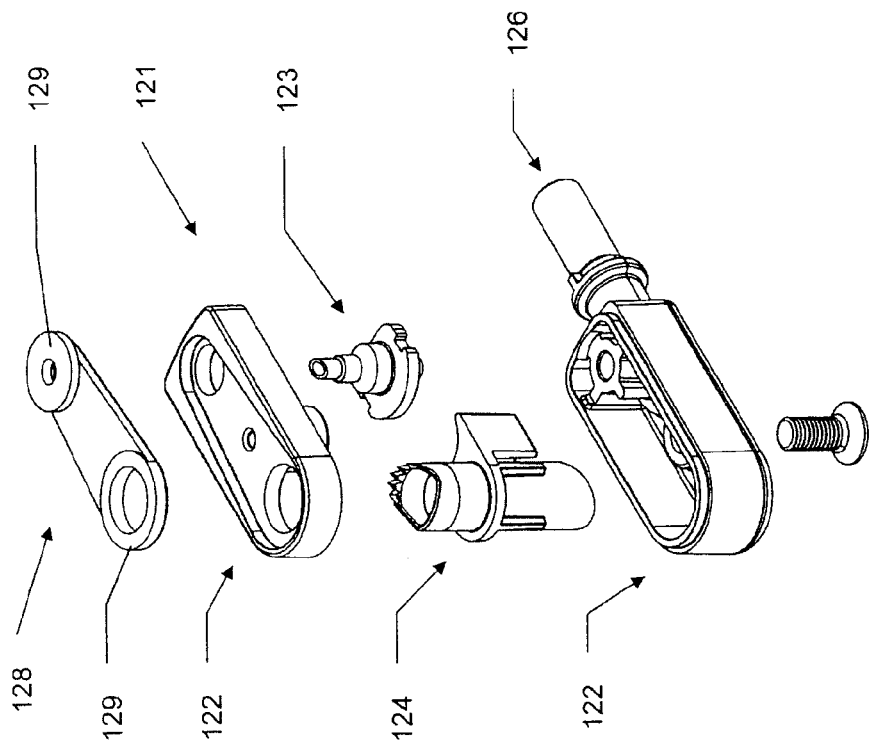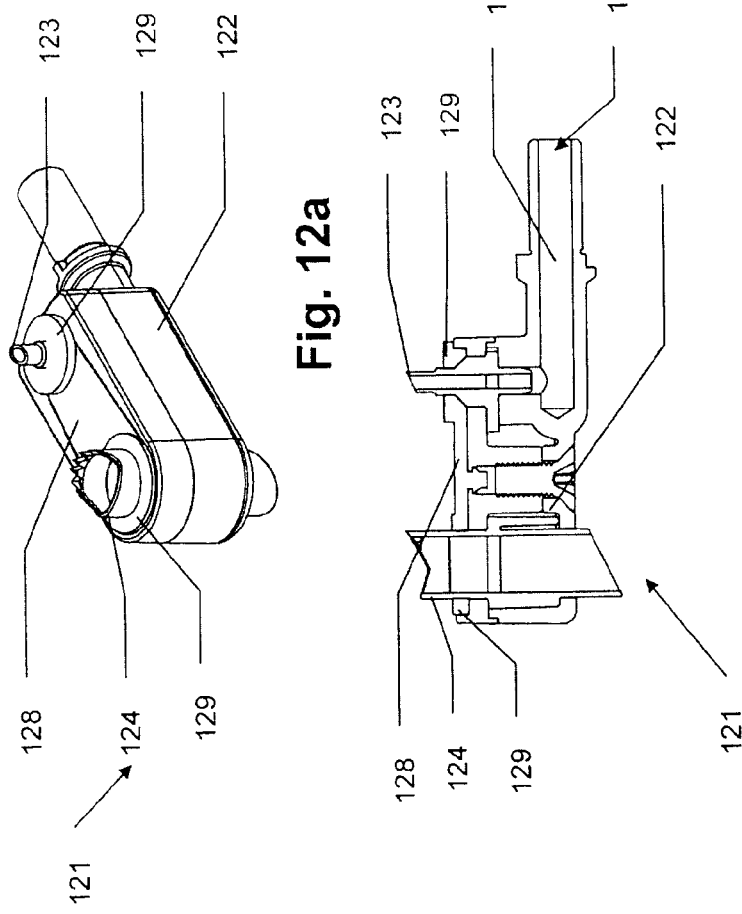
Fig. 12c
Fig. 12a
Fig. 12b

BEVERAGE PREPARATION MACHINES

CROSS-REFERENCE TO RELATED APPLICATIONS

This application is a U.S. national phase application filed under 35 U.S.C. §371 of International Application PCT/US2008/063831, filed on May 16, 2008, designating the United States, which claims benefit to U.S. Application No. 60/940,118, filed on May 25, 2007, and Great Britain application GB 0709586.2, filed on May 18, 2007, all of which are hereby incorporated by reference herein.

FIELD

The present invention relates to improvements in beverage preparation machines and in particular to a delivery head for a beverage preparation machine of the type which use prepackaged containers of beverage ingredients.

BACKGROUND

Beverage preparation machines such as coffee or tea brewing machines are well known. It is known to provide beverage preparation machines which dispense individual servings of beverage directly into a receptacle such as a cup. Such machines may derive the beverage from a bulk supply of beverage ingredients or from packages of beverage ingredients such as pods, pads or cartridges. An example of one type of such packages is shown in EP1440903. In the following specification such packages will be referenced by the general term cartridges. However, the invention is not limited to use with one particular type of pod, pad or cartridge. The beverages are formed from brewing, mixing, dissolving or suspending the beverage ingredients in water. For example, for coffee beverages, heated water is passed through the cartridges to form the extracted solution. The use of cartridges in such machines has become increasingly popular due to their convenience and the quality of the beverage produced.

Use of cartridges in such machines requires accurate positioning of the cartridge within a delivery head of the machine, There is also a desire, for convenience, to automate the removal of cartridges from the delivery head of the machine after use. Known positioning and ejection mechanisms can suffer from drawbacks. In particular, the mechanisms can be bulky and may not be easily adaptable to work with a range of sizes of cartridge.

It is therefore an object of the present invention to provide an improved beverage preparation machine and method which allows for accurate positioning of a cartridge within the machine for dispensation and, optionally, provides an improved ejection mechanism for such cartridges.

SUMMARY

Accordingly, the present invention provides a delivery head for a beverage preparation machine comprising a movable first part, a fixed second part and a cartridge guide;

the first part being movable between an open position and a clamping position;

the cartridge guide being operatively engaged with the first part and slidably movable relative to the second part between a loading position and a dispensing position;

the cartridge guide being located in the loading position when the first part is in the open position so as to enable loading of a cartridge into the cartridge guide;

wherein on movement of the first part into the clamping position the cartridge guide is slidable into the dispensing position due to the operative engagement of the cartridge guide with the first part.

Advantageously, loading the cartridge initially into a loading position which is located at a different point to the eventual dispensing position allows for greater flexibility in the sizes of cartridge that can be accommodated in the delivery head. Also, the automatic movement of the cartridge guide into the dispensing position on movement of the first part into the clamping position improves the speed and ease of use of the delivery head.

Preferably the loading position of the cartridge guide is towards a front of the delivery head and the cartridge guide is slidable into the dispensing position in a rearward manner during closure of the first part. Positioning the loading position to the front of the delivery head improves ease of access of the mechanism to a user.

Preferably the cartridge guide is constrained to be slidable horizontally.

Preferably, the loading and dispensing positions of the cartridge guide are separated by between 5 and 15 mm.

More preferably, the loading and dispensing positions of the cartridge guide are separated by between 7.8 and 10 mm.

The first part may be pivotable about a pivot point between the open and clamping positions. The present invention allows for a pivotable first part to be used in combination with a range of cartridge sizes since the movement of the cartridge guide from the loading to the dispensing positions on closure of the first part helps to prevent fouling of the first part on the cartridge.

Preferably, the cartridge guide is slidable in a horizontal plane and the pivot point is offset from the horizontal plane. Advantageously, the ability to off-set the pivot point of the first part allows for accommodation of other components of the delivery head in a more compact unit.

Preferably, the cartridge guide is operatively engaged with the first part by means of co-operative formations of the cartridge guide and first part.

Preferably, the co-operative formations comprise a pin on one of the cartridge guide and the first part and a channel in the other of the cartridge guide and the first part, wherein the pin is constrained to move along the channel as the first part moves between the open and the clamping positions.

The pin may be formed on the first part and the channel may be formed in the cartridge guide.

Preferably the channel comprises at least a first portion associated with non-movement of the cartridge guide and a second portion associated with movement of the cartridge guide from the loading position into the dispensing position.

For example, the first portion of the channel may comprise an arc of constant radius having a centre of rotation coincident with a pivot point of the first part. The second portion of the channel may comprise a path having an instantaneous centre of curvature non-coincident with the pivot point of the first part.

Preferably the fixed second part comprises a horizontal platen.

The cartridge guide may comprise an annular member defining a cartridge aperture. The cartridge guide may comprise a through hole.

Preferably, the fixed second part forms a support for a cartridge received in the through hole.

The cartridge guide may comprise a location portion sized to receive a handle of a cartridge. Preferably, the location portion of the cartridge guide is positioned to the front of the delivery head on a midline of the delivery head.

The delivery head may comprise inlet and outlet piercers. Preferably, the inlet and outlet piercers are movable relative to the fixed second part between a retracted position and an extended position. In the extended position both the inlet and outlet piercers may extend upwardly proud of the fixed second part.

Preferably with the first part in the clamping position the first part is enabled to clamp a cartridge received in the cartridge guide.

Preferably, the first part comprises a clamping part.

The present invention also provides a beverage preparation machine comprising a delivery head as described above.

The present invention also provides a beverage preparation system comprising a beverage preparation machine as described above and one or more cartridges, wherein the one or more cartridges contain one or more beverage ingredients.

Further, the present invention provides a method of loading a cartridge into a delivery head of a beverage preparation machine of the type having a movable first part, a fixed second part and a cartridge guide, comprising the steps of:

moving the first part into an open position so as to cause the cartridge guide to move into a loading position by virtue of an operative engagement of the cartridge guide and the first part;

loading a cartridge into the cartridge guide;

moving the first part into a closed position thereby causing the cartridge guide to slide relative to the second part into a dispensing position by virtue of the operative engagement of the cartridge guide and the first part.

Preferably the cartridge is clamped by the first part when the first part is in the dispensing position.

Preferably the cartridge guide moves from a foremost position to a rearward position as it moves from the loading position to the dispensing position.

Preferably the cartridge guide slides horizontally.

Preferably, the cartridge guide slides by between 5 and 15 mm between the loading and dispensing positions.

Preferably, the first part pivots between the open and closed positions.

Preferably, the cartridge is supported by the second part in the loading and dispensing positions.

Preferably, the cartridge remains in sliding contact with the second part as it moves from the loading to the dispensing position.

BRIEF DESCRIPTION OF THE DRAWINGS

An embodiment of the present invention will now be described, by way of example only, with reference to the accompanying drawings in which:

FIGS. 8a and 8b are elevational views of the delivery head of FIG. 3 with some parts shown in section and some parts omitted for clarity illustrating movement of a cartridge guide of the delivery head;

FIGS. 9a to 9d are cross-sectional views of the delivery head of FIGS. 8a and 8b with some parts sectioned and with a second cartridge inserted, illustrating movement of the cartridge guide on closure of the delivery head;

FIGS. 11a and 11b illustrate operation of the piercing mechanism of FIG. 10; and FIGS. 12a to 12c illustrate a piercer unit of the delivery head of FIG. 3.

DETAILED DESCRIPTION

Figure 2:
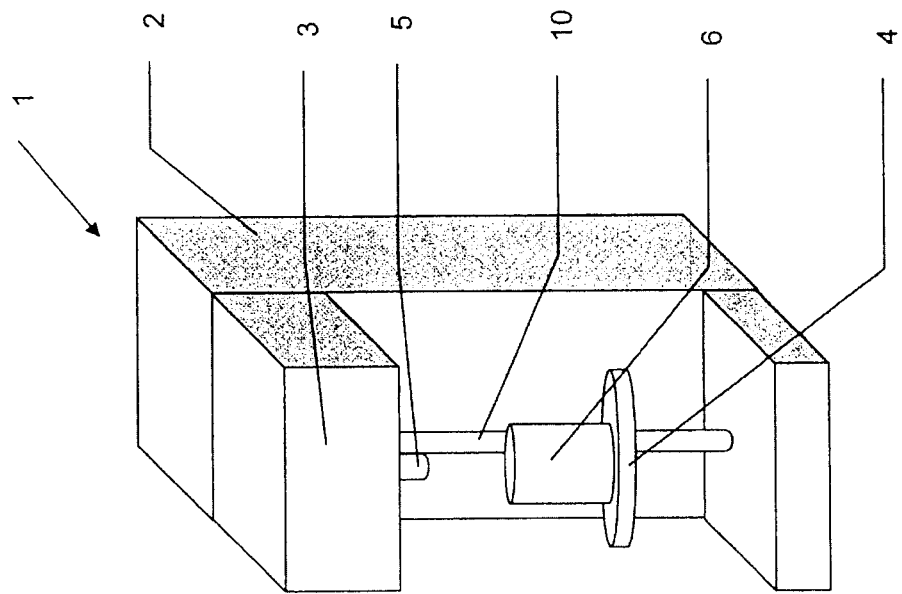
FIG. 2 is a perspective view of a second version of beverage preparation machine according to the present invention which includes a single delivery head.
Figure 1:
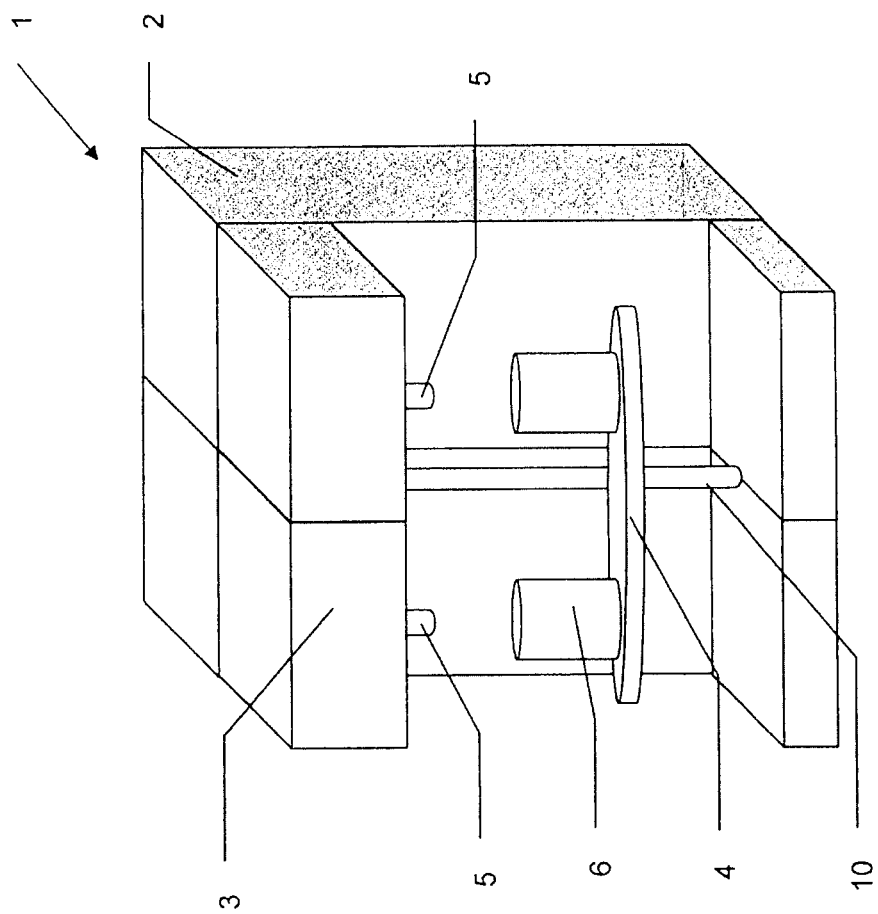
FIG. 1 is perspective view of a first version of beverage preparation machine according to the present invention which includes first and second delivery heads.

The beverage preparation machines 1 of FIGS. 1 and 2 each comprise a housing 2 containing the internal mechanisms of the machine such as a water reservoir, a pump, heating means and control means.

The machine 1 of FIG. 2 comprises a single brewer. The machine 1 of FIG. 1 comprises a first brewer and a second brewer coupled together.

Each brewer of the machines 1 comprises a delivery head 3 provided towards an upper part of the housing 2 in which, in use, is received a cartridge containing one or more beverage ingredients. The delivery head or heads 3 are connected with a chassis of the machine 1 on assembly. The delivery heads 3 are preferably identical. Beverage is dispensed from the brewer through an outlet spout 5 by pumping water from the reservoir of the brewer through the cartridge to form the beverage which is then directed through the outlet spout 5 into a cup 6. As can be seen in FIG. 1, two outlet spouts 5 are provided for a machine with two brewers.

Figure 3:
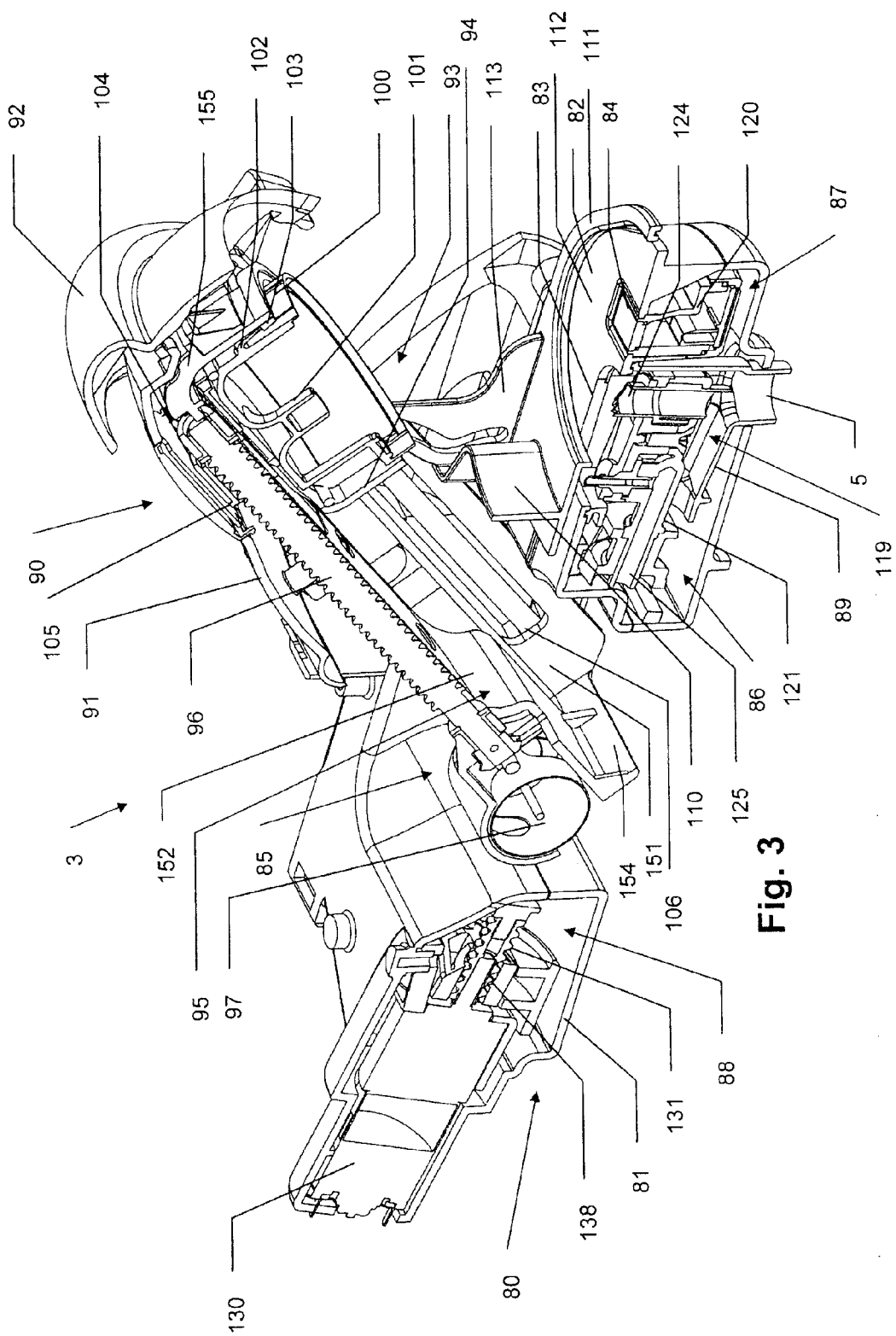
FIG. 3 is a cross-sectioned perspective view of a delivery head according to the present invention in an open position.

As shown in FIG. 3, the delivery head 3 comprises a lower part 80, an upper mechanism 90 and a cartridge guide 110. Some parts of the outer cowling of the delivery head have been omitted for clarity. In practice the outer cowling will comprise a number of mouldings shaped to contain and protect the internal components of the delivery head.

The lower part 80 comprises a housing 81 formed from upper and lower mouldings. The housing 81 defines a motor cavity 88 towards a rear of the delivery head 3, a piercer unit cavity 86 towards a front of the delivery head 3 and a barcode reader cavity 87 at a foremost portion of the delivery head 3. A forward part of the upper surface of the housing 81 is provided with a flattened support surface 82 in which is located a piercer unit aperture 83 and a barcode window 84. Rearward of the support surface 82 the upper moulding is shaped to define an ejection chute 85 that is open to below the delivery head 3.

The upper mechanism 90 comprises a carriage frame 95, a handle 92, a clamping mechanism 93, a lead screw 96, and a motor 97.

The carriage frame 95 forms the core of the upper mechanism and provides a structural framework for the other components of the upper mechanism. The carriage frame 95 comprises an elongate frame extending from a front end 155 to a rear end 154 as shown in FIG. 3. The frame comprises two side members 151 and an upper member 152 joining the two side members 151. The upper member 152 is provided with two upstanding webs 156 as most clearly shown in FIG. 9b. Each side member 151 comprises an elongate side slot 106 and the upper member 152 comprises an elongate upper slot 153 as most clearly shown in FIG. 5. The carriage frame 95 is preferably formed from a single moulding and is symmetric about a midline of the delivery head 3.

The carriage frame 95 is pivoted to the lower part 80 by a pair of hinges 98 formed on the upstanding webs 156 at pivot points 150 as most clearly seen in FIGS. 9b to 9d. The hinges 98 are offset from the upper surface of the lower part 80 and positioned above the level of the support surface 82. As most clearly shown in FIG. 9a by omission of certain parts of the housing 91, the hinges 98 may comprise a cog 157 having teeth 158 which engage with a damping member during pivoting of the carriage frame 95 to thereby provide control over the pivoting speed of the carriage frame 95. For example, the damping member may act to ensure that if the handle 92 of the delivery head 3 is released when the carriage frame 95 is in the raised position then the carriage frame 95 pivots downwardly in a controlled manner rather than free-falling into contact with the lower part 80. The damping member may comprise a cog suitable for engaging the cog 157 and a damper, such as a rotatable vane, movable within a viscous damping fluid such as oil.

The handle 92 is connected to the carriage frame 95 and extends around a front of the delivery head 3. The handle 92 is pivotably connected to the carriage frame 95 by a mechanism such that with the carriage frame 95 in a lowered position the handle 92 can be depressed to engage hooks provided on the handle 92 with bosses provided on the lower part 80 in order to securely hold the carriage frame in the lowered position. An example of such a mechanism is described in EP1440644. However, such a mechanism is not relevant to the present invention. The clamping mechanism 93 comprises a cup-shaped clamp member 100 and a cup-shaped socket 94. The clamp member 100 is provided with a central spigot 101. A plurality of flexible protrusions 102 are provided on an exterior of the clamp member 101 which engage with an inwardly-directed flange 103 of the socket 94 so as to retain the clamp member 100 fixedly within the socket 94 on assembly. The socket 94 is provided on an upper surface with a cylindrical member 104 in which is seated a threaded nut 105. The threaded nut 105 is engaged on the lead screw 96. The socket 94 of the clamping mechanism 93 is also provided with a pair of bosses or similar which are engaged in, and slidable along the side slots 106 of the carriage frame 95 so as to maintain correct orientation of the socket 94 on operation of the lead screw 96. Consequently, rotation of the lead screw 96 can be used to move the socket 94, and hence the clamp member 100 reciprocally along the longitudinal axis of the upper mechanism 90 from the front end 155 to the rear end 154 of the carriage frame 95 as will be described below when the operation of the delivery head 3 is discussed. As best shown in FIGS. 8a and 8b the socket 94 further comprises a pair of tail pieces 108 which extend rearwardly from either side of the cup-shaped body of the socket 94. The tail pieces 108 are each provided with a pin 107 at or near a distal end thereof, the use of which will be described below.

Figure 5:
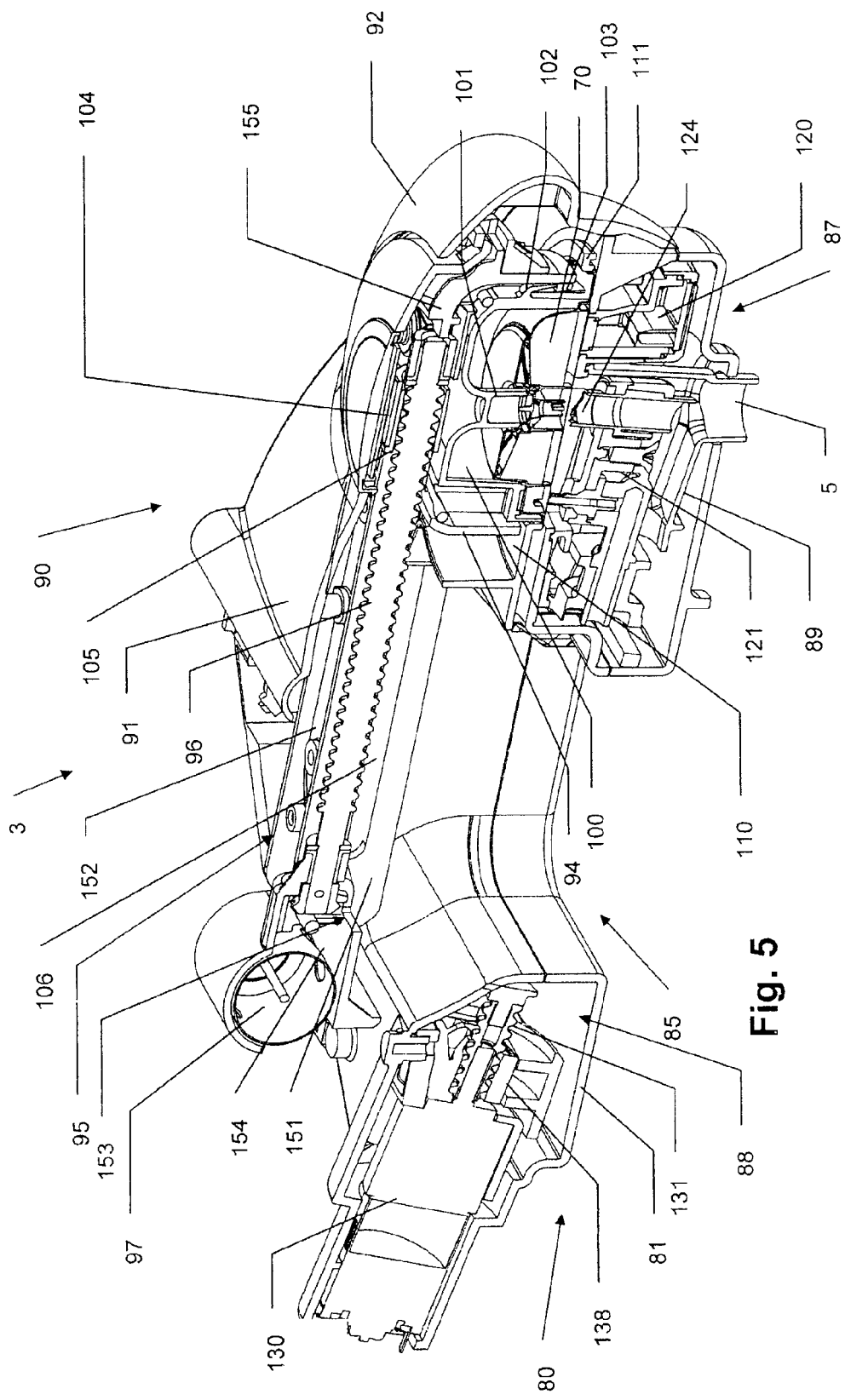
FIG. 5 is a cross-sectioned perspective view of the delivery head of FIG. 3 in a closed position with the cartridge in a dispensing position.

The lead screw 96 is mounted to the carriage frame 95. The lead screw 96 is located towards a top of the carriage frame 95 in the opening provided by the upper slot 153 as shown in FIG. 5. Thus, the lead screw 96 extends above the socket 94 and extends along the longitudinal axis of the upper mechanism 90 from the rear end 154 to the front end 155 of the carriage frame 95. The motor 97 is operatively connected to a rear end of the lead screw 96 and is able to rotate the lead screw 96 both clockwise and counter-clockwise. As shown, the motor 97 is mounted to the carriage frame 95 and transverse the longitudinal axis of the upper mechanism 90 to save space and is connected to the lead screw 96 by means of a suitable gear arrangement such as bevel gears.

The cartridge guide 110 is located in between the lower part 80 and the upper mechanism 90. The cartridge guide 110 rests on and is slidable relative to the lower part 80 whilst being operatively interconnected with the upper mechanism 90 as described below.

Figure 4:
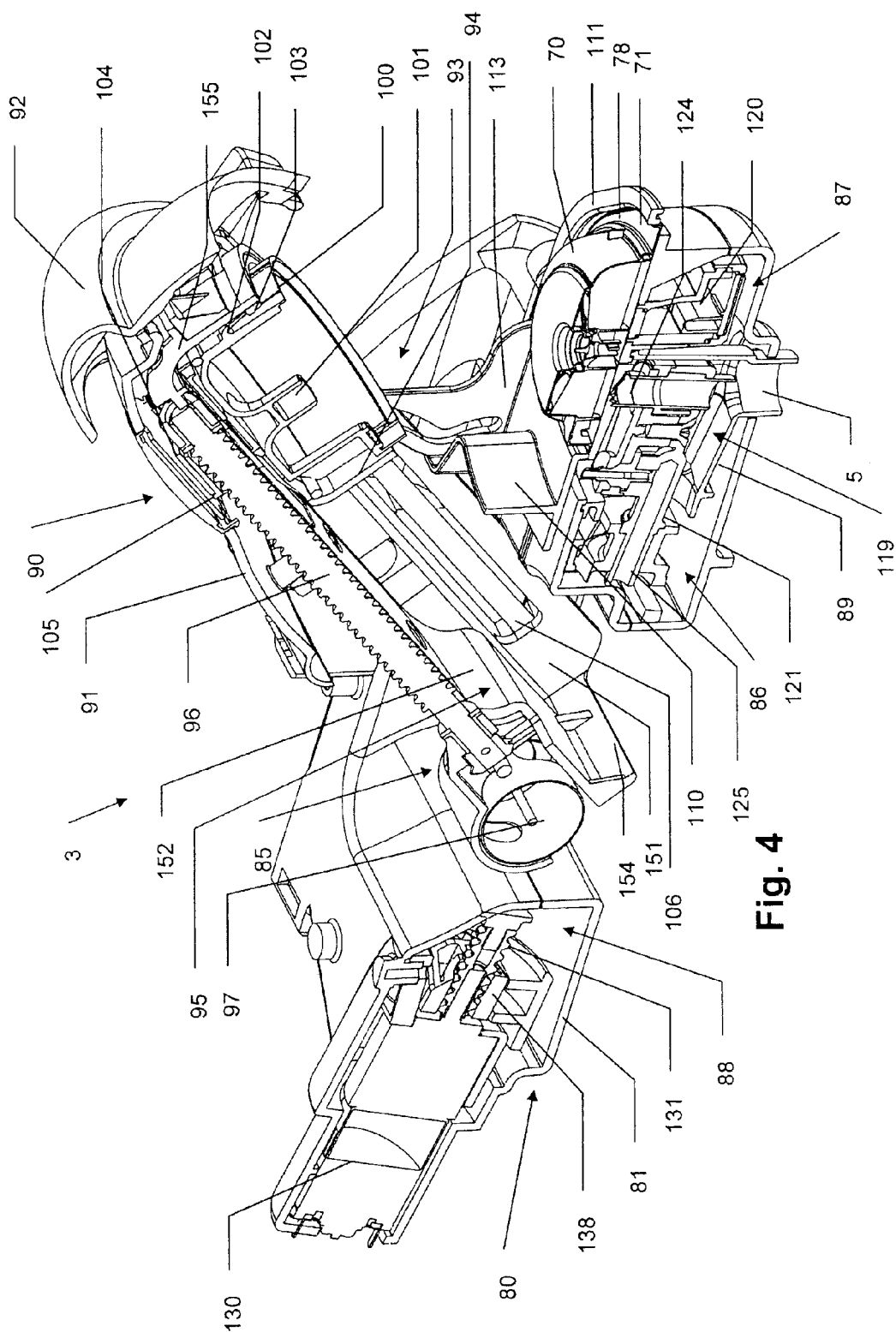
FIG. 4 is a cross-sectioned perspective view of the delivery head of FIG. 3 in the open position and with a first cartridge inserted.

The cartridge guide 110 comprises an annular member 111 and two vertically extending webs 113. The annular member 111 and webs 113 are formed as a single moulding from, for example, a plastics material. The annular member 111 comprises a ring defining an aperture 112 shaped to receive a cartridge 70. The lower face of the cartridge guide 110 rests on the support surface 82. Whilst the aperture 112 closely conforms to the shape of the cartridge 70 in order to enable precise orientation and placement of the cartridge, it is slightly larger than the cartridge 70 such that a cartridge 70 placed within the aperture 112 rests on the support surface 82 of the lower part 80 rather than on the cartridge guide 110 itself. The aperture 112 is shaped also to accommodate a handle portion 71 of the cartridge 70 as shown in FIG. 4. The handle 71 is thereby orientated to a front of the delivery head 3 and positioned symmetrically on the midline of the delivery head 3.

The webs 113 are located on each side of the cartridge guide 110 and, as best shown in FIGS. 8a and 8b, are each provided with a slot 114 of arcuate form in which, on assembly, the pins 107 of the socket 94 are slidingly received. Thus, the cartridge guide 110 and the clamping mechanism are interconnected. Each slot 114 comprises a first portion 115 in the shape of an arc having a centre of rotation coincident with the pivot point 150 of the clamping mechanism 93. Each slot 114 also comprises a second portion 116 in the shape of an arc whose instantaneous centre of curvature is not co-incident with the pivot point 150. The function of the slot 114 will be described below.

The delivery head 3 further comprises a barcode reader 120 and a piercing mechanism 119.

The barcode reader 120 is located in the barcode reader cavity 87 and is orientated to be able to transmit and receive signals through the barcode window 84.

The piercing mechanism 119 comprises a piercer unit 121, a motor 130, a lead screw 131 and a linkage mechanism 133. The piercing mechanism 119 is operative to raise and lower the piercer unit 121. The piercer unit 121 is located in the piercer unit cavity 86 of the lower part 80.

As shown in FIGS. 12a to 12c the piercer unit 121 comprises a body 122 having mounted therein an inlet piercer 123 and an outlet piercer 124. The body 122 is provided with a conduit 125 linking the inlet piercer 123 with a fluid inlet 126 of the body 122. The fluid inlet 126 is coupled by pipework to a supply of water on assembly of the delivery head with the remainder of the machine 1. A seal member 128 is located on an upper face of the body 122 surrounding the inlet piercer 123 and the outlet piercer 124. The seal member 128 is provided with raised annular portions 129 surrounding the piercing element of the inlet piercer 123 and the piercing element of the outlet piercer 124.

The piercer unit cavity 86 is also provided with a spout chute 89 as shown in FIG. 3 into which the piercer unit 121 extends. The spout chute 89 acts as a funnel to channel beverage discharged through the outlet piercer 124 to the outlet spout 5 located at a bottom of the spout chute 89.

The motor 130 is located at a rear of the delivery head 3 remote from the piercer unit 121. The motor 130 is orientated generally in line with a longitudinal axis of the lower part 80 but is angled downwardly slightly below the horizontal. The motor 130 is coupled to the lead screw 131 by means of a threaded, generally U-shaped, rear coupling member 138 as most clearly seen in FIG. 10. A distal end of the lead screw 131 is provided with an end stop. The motor 130 is able to rotate the lead screw 131 both clockwise and counter-clockwise in order to move the rear coupling member 138 reciprocally forwards and backwards relative to the lower part 80.

Figure 10:
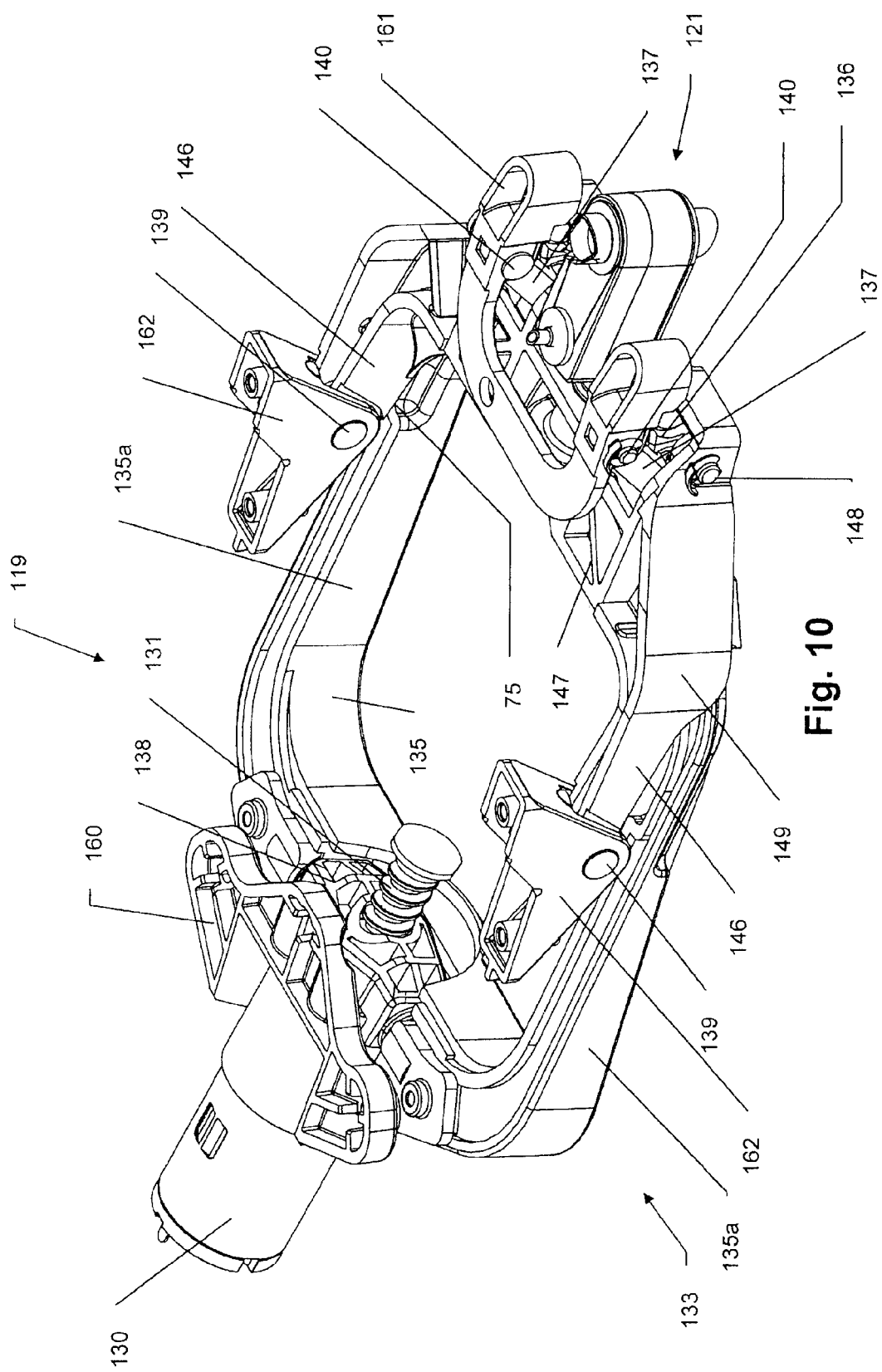
FIG. 10 is a perspective view of a piercing mechanism of the delivery head of FIG. 3.

As shown in FIG. 10, the linkage mechanism 133 comprises a U-shaped primary link 135 having a pair of forward-extending arms 135a, a pair of secondary links 136, a pair of tertiary links 137, the rear coupling member 138 and a forward coupling member 149. The linkage mechanism is mounted to the lower part 80 by means of a rear mounting plate 160, a front mounting plate 161 and two side mounting plates 162 which are all securely mounted to an underside of the upper moulding of the lower part 80.

A pair of first pivot points 139 are provided by the side mounting plates 162. A pair of second pivot points 140 are provided by the front mounting plate 161.

As most clearly shown in FIGS. 10, 11a and 11b, the U-shaped primary link 135 is rotatably coupled at a rear end to the rear coupling member 138.

The forward coupling member 149 comprises a generally U-shaped member having two arms 146 and an interconnecting bridge 147. The distal ends of the arms 146 are rotatably coupled to the first pivot points 139.

The secondary links 136 are rotatably connected to the primary link arms 135a at third pivot points 141 such that a forward end of each primary link arm 135a is connected to a rear end of the respective secondary link 136. The opposite end of each secondary link 136 is rotatably coupled to the forward coupling member 149 at fourth pivot points 148.

The tertiary links 137 are connected between the third pivot points 141 (where the primary link arms 135a and secondary links 136 are coupled) and the second pivot points 140 on the front mounting plate 161.

The piercing unit 121 is rigidly mounted to the interconnecting bridge 147 of forward coupling member 149 as shown in FIG. 10 Alternatively the piercer unit 121 could be formed as one piece with the front coupling member 149.

As most clearly shown in FIG. 10, the linkage mechanism 133 transfers motive force from the motor 130 at the rear of the delivery head 3 to a front of the delivery head 3. In addition, by using pairs of primary link arms 135a, secondary links 136 and tertiary links 137 as well as U-shaped members 135, 149 the linkage mechanism extends around the ejection chute 85 without impeding the chute as shown in FIG. 5.

Operation of the piercing mechanism 119 will be described below.

The beverage preparation machine also comprises a controller for controlling operation of the machine including operation of components of each delivery head 3 such as the motors 95, 130, and the barcode reader 120.

The delivery head 3 may also be provided with interlock or sensing devices linked to the controller to provide data to the controller on the position of the socket 94 on its lead screw 96, the position of the piercing mechanism 119 and the position of the upper mechanism 90, for example whether the upper mechanism 90 is in the closed position Typically an interlock is provided to confirm closure of the handle 92 when the upper mechanism 90 is in the lowered position. Operation of the delivery head 3 is prevented when this interlock indicates that the handle 92 is opened.

As an alternative to providing an interlock on the lead screw 96 to indicate the position of the socket 94 current sensing control may be used. In current sensing the current drawn by the motor 97 is monitored and the controller interprets an increase in the drawn current above a pre-set threshold to be indicative of the socket 94 having reached one of its end stops at either the front end 155 or rear end 154 of the carriage frame 95.

In use, the delivery head 3 is first opened to allow insertion of a cartridge 70 of the type having a bowl-shaped upper portion 76 sealed by a flexible lower membrane 77 around a peripheral flange 78 by moving the upper mechanism 90 into the raised position as shown in FIG. 3. Opening of the upper mechanism is achieved by first opening the handle 92 to disengage the hooks from the bosses of the lower part 80 and then lifting the handle 92. As shown in FIG. 3 and in FIG. 9a, in the raised position of the upper mechanism 90, the cartridge guide 110 is positioned in a forward-most position to ease loading of the cartridge 70 and the clamping member 100 is raised as part of the upper mechanism 90. The cartridge guide 110 is thus positioned because of the interaction of the pins 107 of the tail pieces 108 in the slots 114 of the cartridge guide 110. In particular in the raised position each pin 107 is moved to a top of the first portion 115 of the slot 114 as shown in FIG. 9a.

The cartridge 70 is then inserted into the aperture 112 of the cartridge guide 110 such that the cartridge 70 rests on the support surface 82 as shown in FIG. 4. In FIG. 4 the delivery head 3 is shown with a cartridge 70 having a relatively shallow profile. The handle portion 71 of the cartridge 70 is aligned towards a front of the delivery head 3 and lies on the midline of the delivery head 3.

The upper mechanism 90 is then closed into the position shown in FIG. 5 by pressing down on the handle 92. Closure of the upper mechanism 90 causes the cartridge guide 110 and the cartridge 70 to slide rearwardly over the support surface 82 into a dispensing position wherein the cartridge 70 is correctly aligned with the piercer aperture 83 and the barcode window 84. The rearward movement of the cartridge guide 110 is caused by the interaction of the pins 107 and slots 114. As shown in FIG. 8a, 8b and FIGS. 9a to 9d downward rotation of the upper mechanism 90 causes the clamping mechanism 93 also to rotate downwardly moving the pins 107 first along the first portion 115 of the slots 114 and then along the second portion 116. Movement of the pins 107 along the first portion 115 of the slots to the position shown in FIG. 9c does not cause any movement of the cartridge guide 110 since the centre of curvature of the first portion 115 is coincident with the point of rotation of the clamping mechanism 93. However, further downward rotation of the clamping mechanism 93 does cause rearward sliding of the cartridge guide 110 due to the pins 107 bearing against a rearmost face of the slots 114 to thereby force the cartridge guide 110 to move to accommodate the pin's movement into the position shown in FIG. 9d. In the closed position of the clamping mechanism 93 the cartridge guide 110 has moved in a rearward direction by between 7.8 and 10 mm.

In the closed position the spigot 101 of the clamping member 100 is engaged in a relatively shallow central well 75 formed in the upper portion 76 of the cartridge 70. The clamping member 100 is also provided with a formation 79 aligned with an inlet region of the cartridge 100. The lower rim of the clamping member 100 is aligned with and is designed to make contact with the peripheral flange 78 of the cartridge 70 in the closed position. Thus, in the closed or clamped, position the clamping member 100 applies a clamping force on the cartridge 70. This force is mainly applied to the central region of the cartridge 70 by the spigot 101 and to the inlet region of the cartridge 70 by the formation 79. However, if required the lower rim of the clamping member 100 may apply a relatively small force to the peripheral flange 78. At this point the piercer unit 121 is still lowered. Therefore the force applied to the cartridge 70 urges the cartridge into contact with the support surface 82. Thus, the lower membrane 77 carries some of the applied load in the area immediately surrounding the piercer aperture 83. In addition, the remainder of the load applied to the cartridge 70 is carried through the peripheral flange 78 where it contacts the support surface 82.

Closure of the upper mechanism 90 also triggers operation of the barcode reader 120 to read the barcode on the cartridge 70 by transmitting through the barcode window 84. The received detected signal is then fed to the controller which thereby determines the correct dispense parameters for the inserted cartridge, such as water temperature, volume, steeping time, etc.

Opening of the upper mechanism 90 after a dispense cycle and ejection have taken place results in a reversal of the movement of the cartridge guide 110 described above.

A particular advantage of this movement of the cartridge guide 110 is to allow accommodation of cartridges having a relatively deep profile, such as the type of cartridge 70 shown in FIGS. 9a to 9d. As shown in FIGS. 9a to 9d maintaining the cartridge guide 110 in the loading position of FIG. 9a until the clamping mechanism 93 has rotated partially down to the point shown in FIG. 9c allows the lower rim of the clamping member 100 to clear the upper rear point 73 of the cartridge 70. The subsequent rearward movement of the cartridge 70 allows for a clamping member 100 that closely conforms to the diameter of the cartridge to be used whilst avoiding fouling of the clamping member's rim on a front face 74 of the cartridge or of the spigot 101 on the sides of the relatively deep central well 75 of the cartridge 70. In this way the size of the clamping member 100 is minimised without requiring a substantially vertical movement of the clamping mechanism 93 to be used to allow insertion of cartridges of varying depth.

Figure 6:
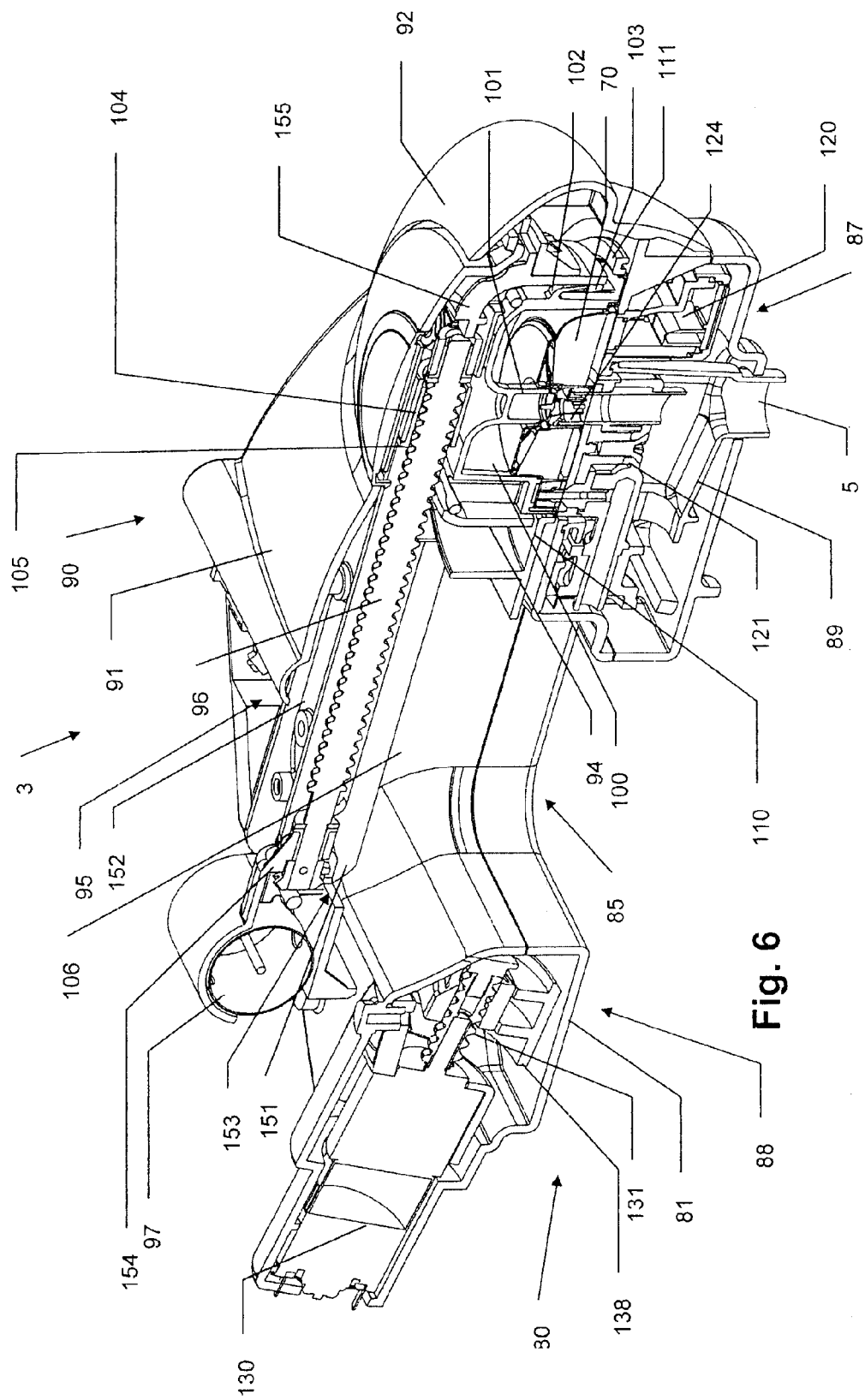
FIG. 6 is a cross-sectioned perspective view of the delivery head of FIG. 3 in the closed position with a piercing unit of the delivery head in a raised position.

As shown in FIG. 5, at this point the piercer unit 121 is in the lowered position such that the inlet piercer 123 and outlet piercer 124 are fully below the level of the support surface 82. On receipt of a start command from the user (by for example, pressing a start/stop button), the controller of the machine 1 operates the motor 130 to raise the piercing mechanism 119 into the raised position shown in FIG. 6 such that the inlet piercer 123 and outlet piercer 124 are raised proud of the level of the support surface 82. In the raised position the piercer unit 121 is raised to the point where the seal member 128 is orientated substantially horizontally with the general level of the seal member 128 being level with the support surface 82. However, in this position the raised annular portions 129 of the seal member 128 lie slightly above the level of the support surface 82. In this way the raised annular portions 129 are able to distort slightly and thereby tension the flexible lower membrane 77 of the cartridge 70. The peripheral flange 78 of the cartridge 70 remains in contact with the support surface 82 due to the constraining contact of the lower rim of the clamping member 100.

In addition, the upward movement of the piercer unit 121 urges the cartridge 70 more tightly against the spigot 101 and the formation 79 of the clamping member 100 to increase the clamping force which holds the cartridge 70 in position between the clamping member 100 and the piercer unit 121. Thus, the combination of the action of the clamping member 100 and the piercer unit 121 creates a minimum clamping force of 30N at the inlet of the cartridge and a force of between 75 and 130N at the outlet.

The movement of the piercing mechanism 119 from lowered to raised position is most clearly seen in FIGS. 11a and 11b and involves a rotation of the piercer unit 121 about its pivot point of between 5 and 10 degrees and preferably greater than 7.5 degrees. On operation of the motor 130, the rear coupling member 138 is moved forwards by approximately 20 mm by rotation of the lead screw 131. As a result of the coupling of the rear coupling member 138 with the primary link 135 the primary link 135 is moved substantially in a direction in line with the longitudinal axis of the primary link although this may be accompanied by a slight rotational movement of the primary link 135 relative to the rear coupling member 138. At the same time the primary link arms 135a push on the lower ends of the secondary links 136. Due to the constraint of the tertiary links 137, which couple the primary link arms 135a and the secondary links 136 to the second pivot points 140, the pushing movement of the primary link arms 135a causes the secondary links 136 to rotate in a clockwise sense as viewed in FIG. 11b. This rotation results in upward rotation of the front coupling member 149 due to the coupling of the secondary links 136 to the front coupling member 149 and the coupling of the arms 148 of the front coupling member 149 to the first pivot points 139 of the side mounting plates 162. Upward rotation of the front coupling member 149 consequently results in upward rotation of the piercer unit 121 due to the rigid connection of the piercer unit 121 to the front coupling member 149. In the raised position, the tertiary links 137 are substantially vertical and also aligned with the secondary links 136 which are also vertically aligned. In this position the secondary and tertiary links are best able to resist the downward loads applied by the clamping member 100 to the cartridge 70. The movement of the secondary and tertiary links also acts in the manner of a toggle clamp wherein the secondary and tertiary links snap into, and have a propensity to remain in, the position of FIG. 11b until a positive retraction force is applied by the motor 130.

Raising of the piercing mechanism 119 causes piercing of the cartridge 70 by the inlet piercer 123 and the outlet piercer 124 to form respectively an inlet and an outlet in the underside of the cartridge 70.

Once the controller detects that the piercer unit 121 is in the raised position dispensation of a beverage from the cartridge 70 begins. As with operation of the lead screw 96 current sensing of the motor 130 may be used by the controller to determine the position of the piercer unit 121. Heated water is channelled from the fluid inlet 126 through the conduit 125 and inlet piercer 123 and into the cartridge. The resultant beverage is discharged through the outlet piercer 124, spout chute 89 and out of outlet 5 into a waiting receptacle 6.

Once dispensation has stopped the piercer unit 121 is lowered by reversing the operation described above by operating the motor 130 in a reverse direction. This clears the inlet piercer 123 and the outlet piercer 124 out of the ejection path of the cartridge 70 and also removes a portion of the loading applied to the cartridge 70.

Figure 7:
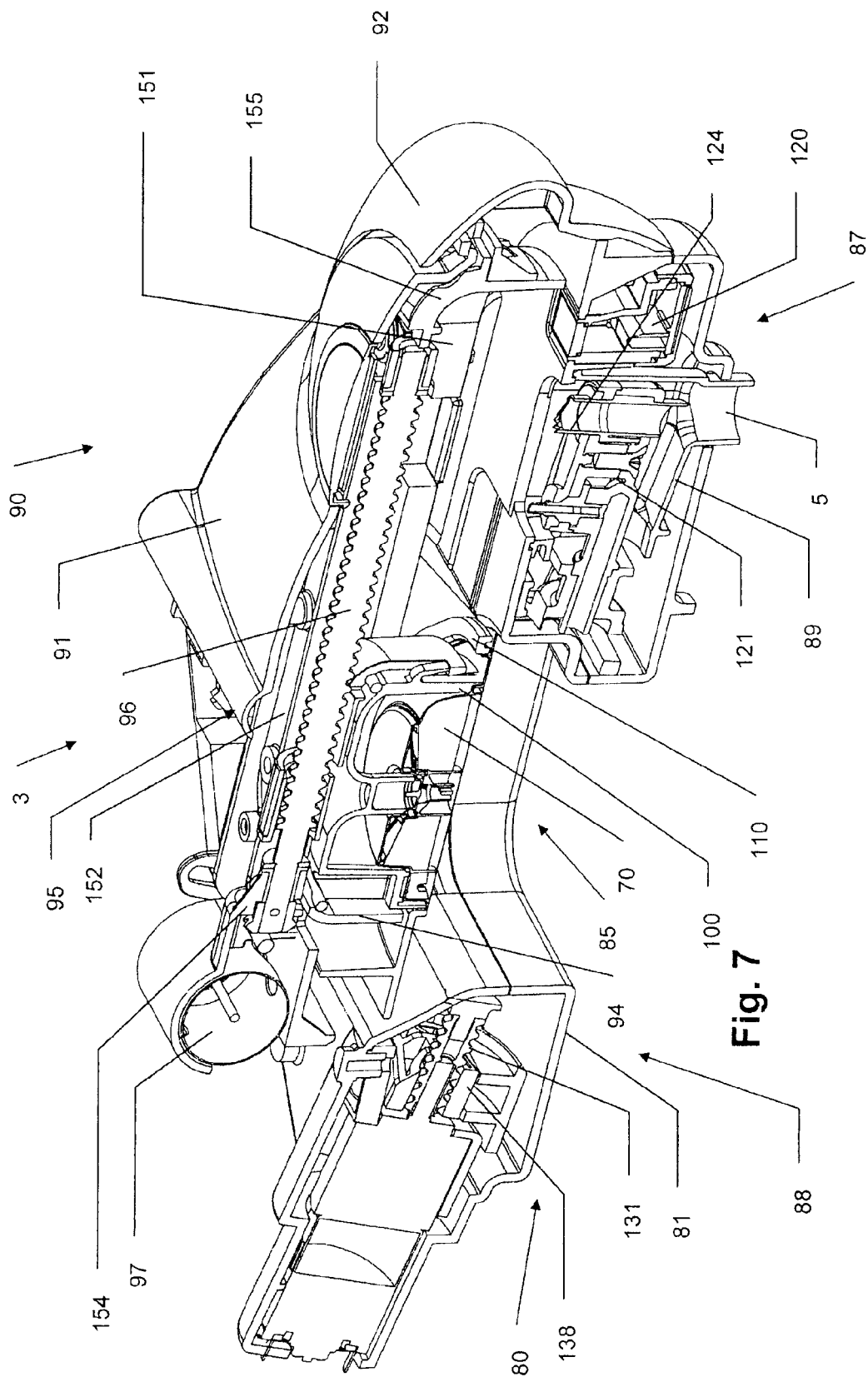
FIG. 7 is a cross-sectioned perspective view of the delivery head of FIG. 3 in an ejection position.

The controller then operates motor 97 to eject the cartridge 70 by movement of the cartridge 70 to an ejection position. Operation of the motor 97 rotates the lead screw 96 causing the clamping socket 94 and clamping member 100 to slide rearwards into the position shown in FIG. 7. The clamping member 100 moves the cartridge 70 along with it thereby dragging the cartridge 70 over the ejection chute 85. During this movement the cartridge 70 is still under some loading from the socket 94 of the upper mechanism 90. Once the cartridge 70 is substantially or wholly aligned with the chute 85 it falls under gravity down the chute 85 into a waste bin in a lower part of the machine 1. It is to be noted that during this movement the outer part of the housing 91 of the upper mechanism 90 remains stationary such that the motion of the clamping mechanism 93 remains internal to the delivery head 3. A particular advantage is that the delivery head 3 does not need to be opened in order to eject the cartridge 70. In addition, the clamping mechanism 93 affects not only clamping of the cartridge 70 during dispensation of beverage but also ejection of the cartridge 70.

The motor 97 is then reversed to move the clamping mechanism 93 back into the forward position ready for the next dispensing cycle.

Optionally a steam purge may be used to clean the piercer unit cavity 86, support surface 82, and clamping member 100. Steam is directed through the inlet piercer 123. The steam purge may be carried out with the piercer body 121 in the raised or lowered position. In addition, it may be carried out automatically after each dispensation cycle and or carried out from time to time under either manual user control or automatic control of the controller. A steam purge may also be used during the dispensation cycle when the cartridge 70 is in the dispensation position to dry out the cartridge 70 and to help drive out any remaining liquid in the cartridge 70.

The invention claimed is:

1. A delivery head for a beverage preparation machine comprising a movable first part, a fixed second part and a cartridge guide;
    the first part being pivotally attached to the second part and movable between an open position and a clamping position;
    the cartridge guide being operatively engaged with the first part and slidably movable relative to the second part between a loading position and a dispensing position;
    the cartridge guide being located in the loading position when the first part is in the open position so as to enable loading of a cartridge into the cartridge guide;
    wherein on movement of the first part from the open position toward the clamping position the cartridge guide slides into the dispensing position due to the operative engagement of the cartridge guide with the first part;
    wherein the cartridge guide is constrained to be slidable horizontally.

2. A delivery head as claimed in claim 1 wherein the loading position of the cartridge guide is towards a front of the delivery head and the cartridge guide is slidable into the dispensing position in a rearward manner during closure of the first part.

3. A delivery head as claimed in claim 1 wherein the cartridge guide is operatively engaged with the first part by means of co-operative formations of the cartridge guide and first part.

4. A delivery head as claimed in claim 1 wherein with the first part in the clamping position the first part is enabled to clamp a cartridge received in the cartridge guide.

5. A beverage preparation machine comprising a delivery head as claimed in claim 1.

6. A beverage preparation system comprising a beverage preparation machine as claimed in claim 5 and one or more cartridges, wherein the one or more cartridges contain one or more beverage ingredients.

7. A delivery head as claimed in claim 1 wherein a beverage can be dispensed from a cartridge loaded into the cartridge guide with the cartridge guide in the dispensing position.

8. A delivery head for a beverage preparation machine comprising a movable first part, a fixed second part and a cartridge guide;
    the first part being pivotally attached to the second part and movable between an open position and a clamping position;
    the cartridge guide being operatively engaged with the first part and slidably movable relative to the second part between a loading position and a dispensing position;
    the cartridge guide being located in the loading position when the first part is in the open position so as to enable loading of a cartridge into the cartridge guide;
    wherein on movement of the first part from the open position toward the clamping position the cartridge guide slides into the dispensing position due to the operative engagement of the cartridge guide with the first part;
    wherein the first part is pivotable about a pivot point between the open and clamping positions, the cartridge guide is slidable in a horizontal plane and the pivot point is offset from the horizontal plane.

9. A delivery head for a beverage preparation machine comprising a movable first part, a fixed second part and a cartridge guide;
    the first part being pivotally attached to the second part and movable between an open position and a clamping position;
    the cartridge guide being operatively engaged with the first part and slidably movable relative to the second part between a loading position and a dispensing position;
    the cartridge guide being located in the loading position when the first part is in the open position so as to enable loading of a cartridge into the cartridge guide;
    wherein on movement of the first part into the clamping position the cartridge guide is slidable into the dispensing position due to the operative engagement of the cartridge guide with the first part,
    wherein the cartridge guide is operatively engaged with the first part by means of co-operative formations of the cartridge guide and first part,
    wherein the cooperative formations comprise a pin on one of the cartridge guide and the first part and a channel in the other of the cartridge guide and the first part, the pin being constrained to move along the channel as the first part moves between the open and the clamping positions wherein the channel comprises at least a first portion associated with non-movement of the cartridge guide and a second portion associated with movement of the cartridge guide from the loading position into the dispensing position, the first portion of the channel comprising an arc of constant radius having a centre of rotation coincident with a pivot point of the first part, the second portion of the channel comprising a path having an instantaneous centre of curvature non-coincident with the pivot point of the first part.

10. A delivery head for a beverage preparation machine comprising a first part, a second part and a cartridge guide;
    the first part being pivotal relative to the second part and movable between an open position and a closed position;
    the cartridge guide being connected to the first part and movable relative to the second part between a loading position and a dispensing position;
    the cartridge guide being located in the loading position when the first part is in the open position so as to enable loading of a cartridge into the cartridge guide and being in the dispensing position when the first part is in the closed position;
    wherein on movement of the first part from the open position toward the closed position the cartridge guide and the second part move translationally relative to one another as the cartridge guide moves toward the dispensing position.

11. A delivery head as claimed in claim 10 wherein a beverage can be dispensed from a cartridge loaded into the cartridge guide with the cartridge guide in the dispensing position.

12. A delivery head as claimed in claim 10 further comprising co-operative formations configured to permit the relative translational movement of the cartridge guide and the second part with movement of the first part toward the closed position.

13. A delivery head as claimed in claim 12 wherein the cooperative formations includes a pin and a channel, the pin being constrained to move along the channel as the first part moves between the open and the closed positions.

14. A delivery head as claimed in claim 13 wherein the channel comprises at least a first portion associated with non-translational movement of the cartridge guide relative to the second part and a second portion associated with translational movement of the cartridge guide relative to the second part, wherein one of the first and second portions of the channel comprises an arc of constant radius having a centre of rotation coincident with a pivot point of the first part, the second portion of the channel comprising a path having an instantaneous centre of curvature non coincident with the pivot point of the first part.

15. A delivery head as claimed in claim 10 further comprising a piercer unit having an inlet piercer and an outlet piercer configured to pierce a cartridge on a common side of the cartridge.

16. A delivery head as claimed in claim 15 wherein both the inlet and outlet piercers are oriented generally parallel to each other.

17. A delivery head as claimed in claim 10 wherein the open position of the first part is disposed toward a rear of the delivery head and the closed position of the first part is disposed toward a front of the delivery head such that movement of the first part from the open position to the closed position includes moving the first part forward relative to the delivery head.

18. A delivery head as claimed in claim 10 wherein with the first part in the closed position the cartridge is configured to be clamped with the cartridge received in the cartridge guide.

19. A beverage preparation machine comprising a delivery head as claimed in claim 10.

20. A delivery head as claimed in claim 10 further comprising a channel and a pin constrained to move along the channel as the first part moves between the open and closed positions; and
    a first curved portion of the channel configured to direct the pin along a first curved path extending about a center of rotation; and
    a second curved portion of the channel having a different curvature than the first curved portion and configured to direct the pin along a second curved path extending about a center of curvature non-coincident with the center of rotation of the first curved portion.

21. A delivery head as claimed in claim 10 wherein the cartridge guide is constrained to only translational movement relative to the second part between the loading position and the dispensing position.

22. A delivery head as claimed in claim 10 wherein the connection between the cartridge guide and the first part includes an operative engagement between the cartridge guide and the first part so that on movement of the first part from the open position toward the closed position the cartridge guide moves translationally relative to the second part into the dispensing position due to the operative engagement of the cartridge guide with the first part.

23. A delivery head as claimed in claim 10 wherein the second part is fixed and wherein on movement of the first part from the open position toward the closed position the cartridge guide moves translationally relative to the fixed second part toward the dispensing position.

24. A delivery head for a beverage preparation machine comprising a first part, a second part and a cartridge guide;
    the first part being pivotal relative to the second part and movable between an open position and a closed position;
    the cartridge guide being movable relative to the second part between a loading position and a dispensing position;
    the cartridge guide being located in the loading position when the first part is in the open position so as to enable loading of a cartridge into the cartridge guide and being in the dispensing position when the first part is in the closed position;
    wherein movement of the first part from the open position toward the closed position causes movement including translational movement of one of the cartridge guide and the second part relative to the other of the cartridge guide and the second part.

25. A delivery head as claimed in claim 24 further comprising an inlet piercer and an outlet piercer mounted on the second part configured to pierce a cartridge on a common side of the cartridge.

26. A delivery head as claimed in claim 24 further comprising a channel and a pin constrained to move along the channel as the first part moves between the open and closed positions.

27. A delivery head as claimed in claim 26 wherein the channel comprises:
    a first curved portion of the channel having a curvature extending about a center of rotation; and
    a second curved portion of the channel having a curvature different than the curvature of the first curved portion and extending about a center of curvature non-coincident with the center of rotation of the first curved portion.

28. A delivery head as claimed in claim 27 wherein the first curved portion of the channel has a constant radius and the center of rotation of the first curved portion is substantially coincident with a pivot point of the first part with the first part in the open position.

29. A beverage preparation machine comprising a delivery head as claimed in claim 24.

30. A delivery head as claimed in claim 24 wherein the cartridge guide includes an aperture sized to receive a beverage cartridge.

31. A method of loading a cartridge into a delivery head of a beverage preparation machine of the type having a movable first part, a fixed second part and a cartridge guide, comprising the steps of:
    moving the first part into an open position by pivoting it relative to the second part so as to cause the cartridge guide to move into a loading position by virtue of an operative engagement of the cartridge guide and the first part;
    loading a cartridge into the cartridge guide;
    moving the first part from the open position toward a closed position thereby causing the cartridge guide to slide relative to the second part into a dispensing position by virtue of the operative engagement of the cartridge guide and the first part;
    wherein the cartridge guide slides horizontally.

32. The method of claim 31 wherein the cartridge is clamped by the first part when the cartridge guide is in the dispensing position.

33. The method of claim 31 wherein the cartridge guide moves from a foremost position to a rearward position as it moves from the loading position to the dispensing position.

34. The method of claim 31 wherein the first part pivots between the open and closed positions.

35. The method of claim 31 wherein the cartridge is supported by the second part in the loading and dispensing positions, and remains in sliding contact with the second part as it moves from the loading to the dispensing position.

36. The method of claim 31 further comprising dispensing a beverage from the cartridge loaded in the cartridge guide when the cartridge guide is in the dispensing position.

37. A method of loading a cartridge into a delivery head of a beverage preparation machine of the type having a first part, a second part and a cartridge guide, comprising the steps of:
   moving the first part into an open position by pivoting it relative to the second part so as to cause the cartridge guide to move into a loading position;
   loading a cartridge into the cartridge guide;
   moving the first part from the open position toward a closed position thereby causing the cartridge guide and the second part to move translationally relative to one another as the cartridge guide moves toward a dispensing position thereof.

38. The method of claim 37 further comprising dispensing a beverage from the cartridge loaded in the cartridge guide when the cartridge guide is in the dispensing position.

39. The method of claim 37 wherein moving the first part from the open position toward the closed position thereby causing the cartridge guide and the second part to move translationally relative to one another includes sliding a pin along a channel.

40. The method of claim 37 further comprising pivoting inlet and outlet piercers relative to the cartridge loaded in the cartridge guide.

41. The method of claim 37 further comprising piercing a lid of the cartridge with inlet and outlet piercers.

* * * * *